United States Patent [19]
Fasig

[11] Patent Number: 5,325,491
[45] Date of Patent: Jun. 28, 1994

[54] METHOD AND APPARATUS FOR EXTENDING A COMPUTER BUS

[75] Inventor: Jonathan L. Fasig, Rochester, Minn.

[73] Assignee: International Business Machines Corporation, Armonk, N.Y.

[21] Appl. No.: 47,018

[22] Filed: Apr. 13, 1993

Related U.S. Application Data

[62] Continuation of Ser. No. 503,187, Apr. 2, 1990, abandoned.

[51] Int. Cl.$^5$ ............................................. G06F 13/40
[52] U.S. Cl. ........................... 395/325; 364/DIG. 2; 364/929.5; 364/935.47; 364/950.1
[58] Field of Search ...................... 395/325; 361/413

[56] References Cited

U.S. PATENT DOCUMENTS

| | | | |
|---|---|---|---|
| 4,414,664 | 11/1983 | Greenwood | 371/20 |
| 4,462,084 | 7/1984 | Greenwood | 364/900 |
| 4,468,737 | 8/1984 | Bowen | 364/200 |
| 4,507,732 | 3/1985 | Catiller et al. | 364/200 |
| 4,535,404 | 8/1985 | Shenk | 364/200 |
| 4,554,657 | 11/1985 | Wilson | 370/85 |
| 4,631,659 | 12/1986 | Haya, II et al. | 364/200 |
| 4,727,491 | 2/1988 | Culley | 364/200 |
| 4,802,120 | 1/1989 | McCoy | 395/550 |
| 4,807,109 | 2/1989 | Farrell et al. | 364/200 |
| 4,831,358 | 5/1989 | Ferrio et al. | 340/825.5 |
| 4,831,516 | 5/1989 | Tanaka et al. | 364/700 |
| 4,841,440 | 6/1989 | Yonezu et al. | 364/200 |
| 4,931,922 | 7/1990 | Baty | 395/275 |

OTHER PUBLICATIONS

IBM Technical Disclosure Bulletin, vol. 29, No. 2, Jul. 1986, "Bus Extender For The STD Bus".
IBM Technical Disclosure Bulletin, vol. 26, No. 12, May 1984, "Bus Extension System", T. Yanagi.

*Primary Examiner*—Debra A. Chun
*Attorney, Agent, or Firm*—Richard E. Billion; Roy W. Truelson

[57] ABSTRACT

Disclosed is a bus expansion unit for extending the bus of a computer system which has an asynchronous bus cycle. The bus expansion unit includes an asynchronous state machine which uses a delay line to determine some of its states. The bus expansion unit recognizes the address and bus status and holds or latches a select signal. In addition, the bus expansion unit delays the −CMD signal until the peripheral has the opportunity to place valid data on a bus channel. In addition, the bus expansion unit includes an arbitration circuit for the peripheral attached thereto.

17 Claims, 19 Drawing Sheets ically, several additional positions on the backplane of a com-
METHOD AND APPARATUS FOR EXTENDING A COMPUTER BUS This application is a continuation of Ser. No. 503,187 filed Apr. 2, 1990, now abandoned.

BACKGROUND OF THE INVENTION

Over the lifetime of a computer system there is a possibility that many new products will be developed for use by owners and users of a computer. Typically, several additional positions on the backplane of a computer are provided so that additional capability may be added to the computer. New cards can be plugged into what are commonly referred to as expansion slots and the cards may include connectors to which a peripheral device may be connected. The expansion slots provide access to the bus in a computer over which data, commands, requests, and other information vital to the operation of both the computer and the peripheral pass. Typically a fixed number of these expansion slots are provided within a particular computer. Over the lifetime of a computer a user may want to add more peripheral devices to a computer than the number of expansion slots that are provided. In order to accommodate the users need to grow a system by adding more peripheral products, it is generally necessary to provide a piece of equipment which extends the bus to a location outside of a particular computer such as a secondary cabinet or enclosure. Once the bus is outside of the computer additional peripherals can be added thereby allowing users to add memory, additional disk drives, and other additional products for use with a particular computer. Allowing the users to add the products they need allows users to customize their system in response to particular needs they might have. Allowing for the addition of products to a system also lets computer users grow their system and extend the useful life of a particular system.

Computers generally operate and carry out certain functions at periodic times. Computers generally carry an oscillating clock signal which provides periodic signal timing reference points to delineate the phases of basic information transfer sequences known as bus cycles. An example will illustrate how computer buses designed using a clock cycle work. When the computer needs information from a device outside its central processing unit, the computer sends a command to a particular device. For example, the central processing unit may command the memory device to fetch particular information during a first clock cycle. The peripheral memory device recognizes the command, fetches the desired information and sends it down the data carrying portion of the bus during the second clock cycle. After the second clock cycle, the data is used by the central processing portion of the computer to perform the functions necessary to accomplish a particular task. In the design of the bus, the cycle time generally had to be selected that would allow each of the peripherals to answer. The slowest operation, therefore, dictated how many clock cycles had to set aside for a bus cycle. Generally, the bus could be easily extended to a position outside of the computer box as long as the designer knew the length of the bus cycle.

In computing, increasing the speed at which computations or a total task can be accomplished is always a desirable goal. Increased speed allows users to accomplish more tasks in a given period of time. In order to increase the speed at which a particular task is done, some bus designs have moved away from the use of clock signals. Such a design has been implemented in the PS/2 model of computer made by International Business Machines ("IBM") of Armonk, N.Y. The IBM PS/2 computer bus includes an address bus, a data bus, a transfer control bus, an arbitration bus, and multiple support signals. The design of the Micro Channel uses an asynchronous protocol for control and data transfer between memory, input/output ("I/O"), and the system central processing unit. In other words, operations of the bus have been made asynchronous in order to increase the overall speed at which the computer can perform operations.

In addition, to increase the speed at which specific tasks are accomplished shorter amounts of time are allotted for a peripheral device to respond in one way or another. This amount of time is so short that the time necessary for an electrical signal to travel down a length of wire outside of the computer chassis and back again may delay the response beyond the time allotted in the design for response to a command. This, for example, is the case for the Micro Channel bus design for the IBM PS/2 model of computer. As a result, this has produced a whole new set of problems to overcome in order to design a piece of equipment which will allow the bus to be extended outside of the chassis of the computer. Thus, there is a need for an method and apparatus which can be used to extend a data bus using asynchronous protocols for certain functions so that a user can add additional devices to a computer having such a design.

SUMMARY OF THE INVENTION

Disclosed is a method and apparatus for extending a bus, such as the Micro Channel bus of the IBM model PS/2, outside the chassis of a computer where the bus is characterized by an asynchronous protocol for control and data transfer between memory, input/output ("I/O"), and the system central processing unit. The apparatus and method disclosed includes a driver card, a receiver card, and a motherboard card for attaching a number of peripheral devices. The apparatus and method include a latching mechanism for holding a select signal, a delay line, and an asynchronous state machine which passes through four states. The apparatus recognizes a valid address and command signal from the bus, activates a control line telling the computer that the particular peripheral is not ready to put data on the bus and delays the end of the bus cycle until valid data can be received from the peripheral and placed on the bus. The device and method disclosed controls the bus cycle asynchronously.

BRIEF DESCRIPTION OF THE DRAWINGS

For a better understanding of the present invention reference may be made to the accompanying drawings in which.

These drawings are not intended as a definition of the invention but are provided solely for the purpose of illustrating the preferred embodiment of the inventions described below.

DETAILED DESCRIPTION OF THE PREFERRED EMBODIMENT

Figure 1:
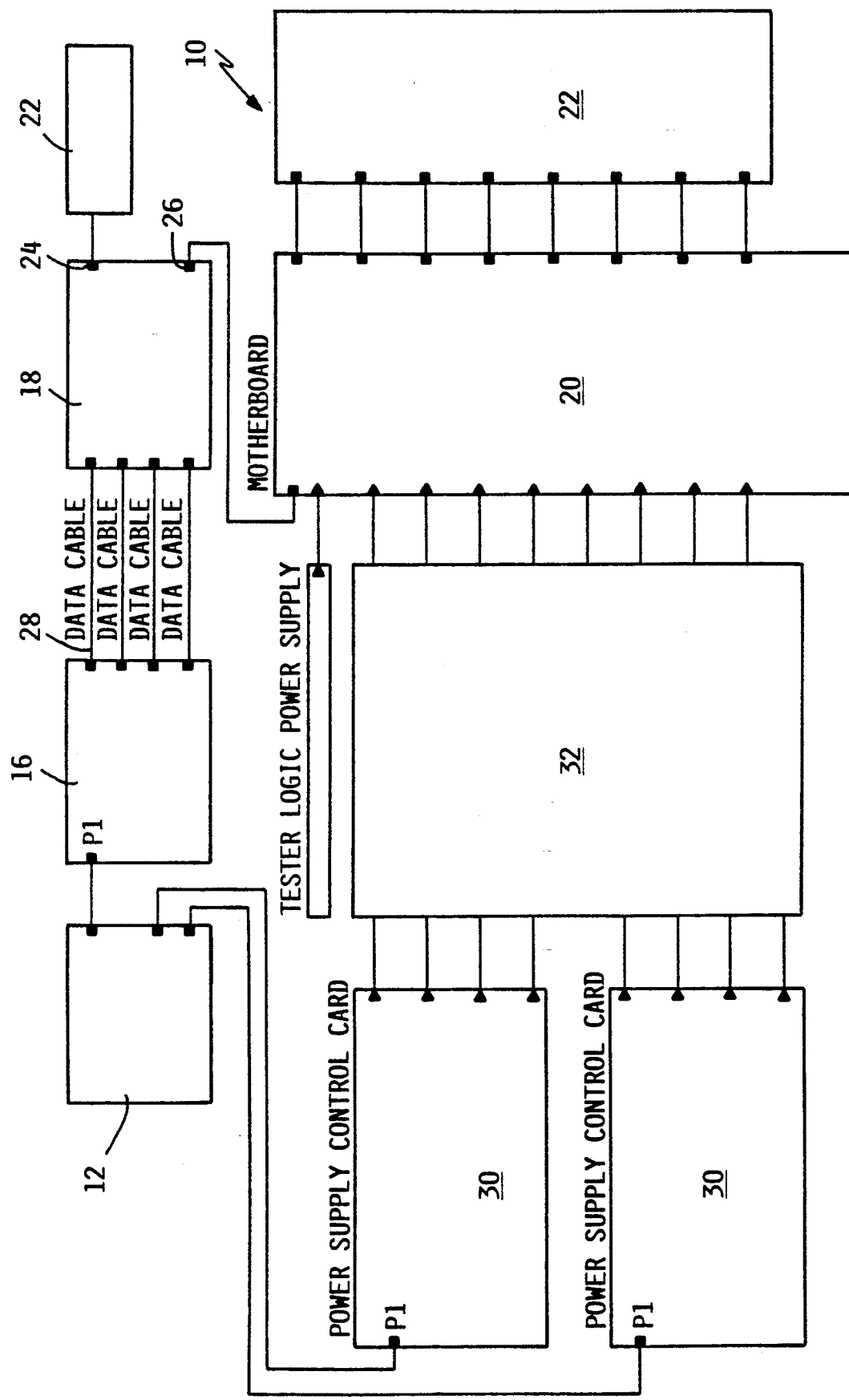
FIG. 1 is a block diagram showing the components of the inventive bus expansion unit attached to a computer.

FIG. 1 shows a bus extension unit 10 connected to a computer 12, such as an IBM model PS/2. The computer 12 has a bus for carrying addresses, data, and control signals. Specifically the bus for the computer 12 includes an address bus, a data bus, a transfer control bus, an arbitration bus, and carries multiple support signals. The bus of computer 12 is also designed so that the channel architecture uses asynchronous protocols for control and data transfer between memory, I/O devices, and the system microprocessor. The IBM model PS/2 has such a bus. In the IBM model PS/2, the bus is called Micro Channel. The computer 12 is provided with several slots 14, one of which is used to connect the bus expansion unit 10 to the computer 12.

The bus expansion unit 10 includes a driver card 16, a receiver card 18, and a motherboard card 20. A number of peripheral devices 22 are connected to the motherboard 20. Also shown in FIG. 1 is an alternate configuration where a single peripheral device 22 connected to the receiver card 18 in place of the motherboard 20. The bus adapter unit 10 shown in this example was used to test multiple disk drives. In some cases, it was desirable to test one peripheral device 22. As a result, the receiver card 18 was provided with a first connector 24 which was used to connect a single peripheral device 22 directly into the receiver card 18. The receiver card 18 was also provided with a second connector 26 for receiving the motherboard card 20. A cable assembly 28 connects the driver card 16 and the receiver card 18. In FIG. 1, this is shown as four data cables.

Also shown in FIG. 1 are a pair of power supply control cards 30 and power supplies 32. The power supplies 32 provide power to the peripheral devices 22 while the power supply control cards 30 control the magnitudes of the supply voltages. The power supply control cards 30 and the power supplies 32 are known in the art and therefore will be mentioned as needed but will not be detailed.

Figure 2A:
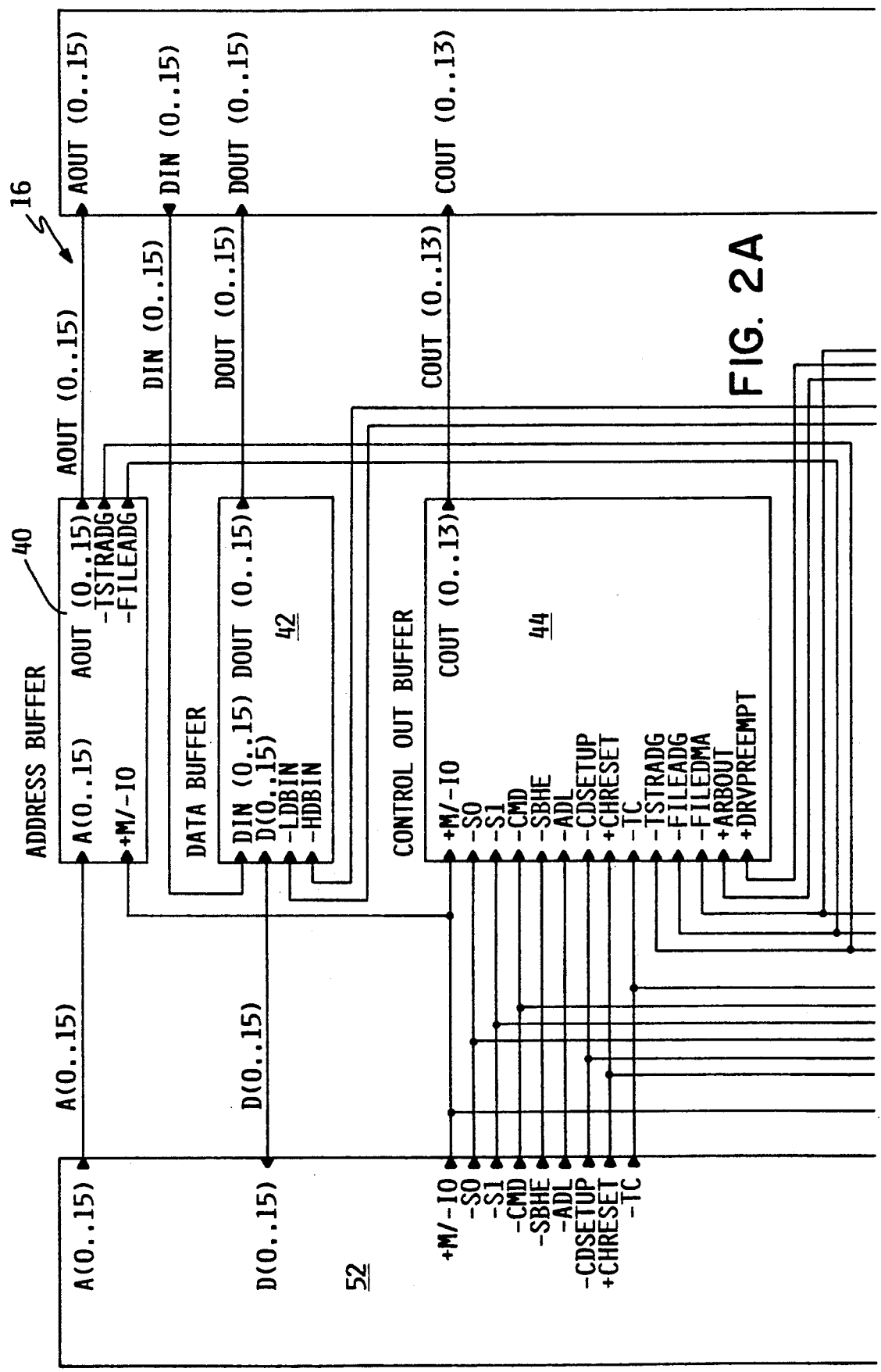
FIG. 2 consisting of FIGS. 2A and 2B, is a diagram showing the various inputs and outputs from an IBM PS/2 as well the various signals that travel between the various components of the bus expansion unit.
Figure 2B:
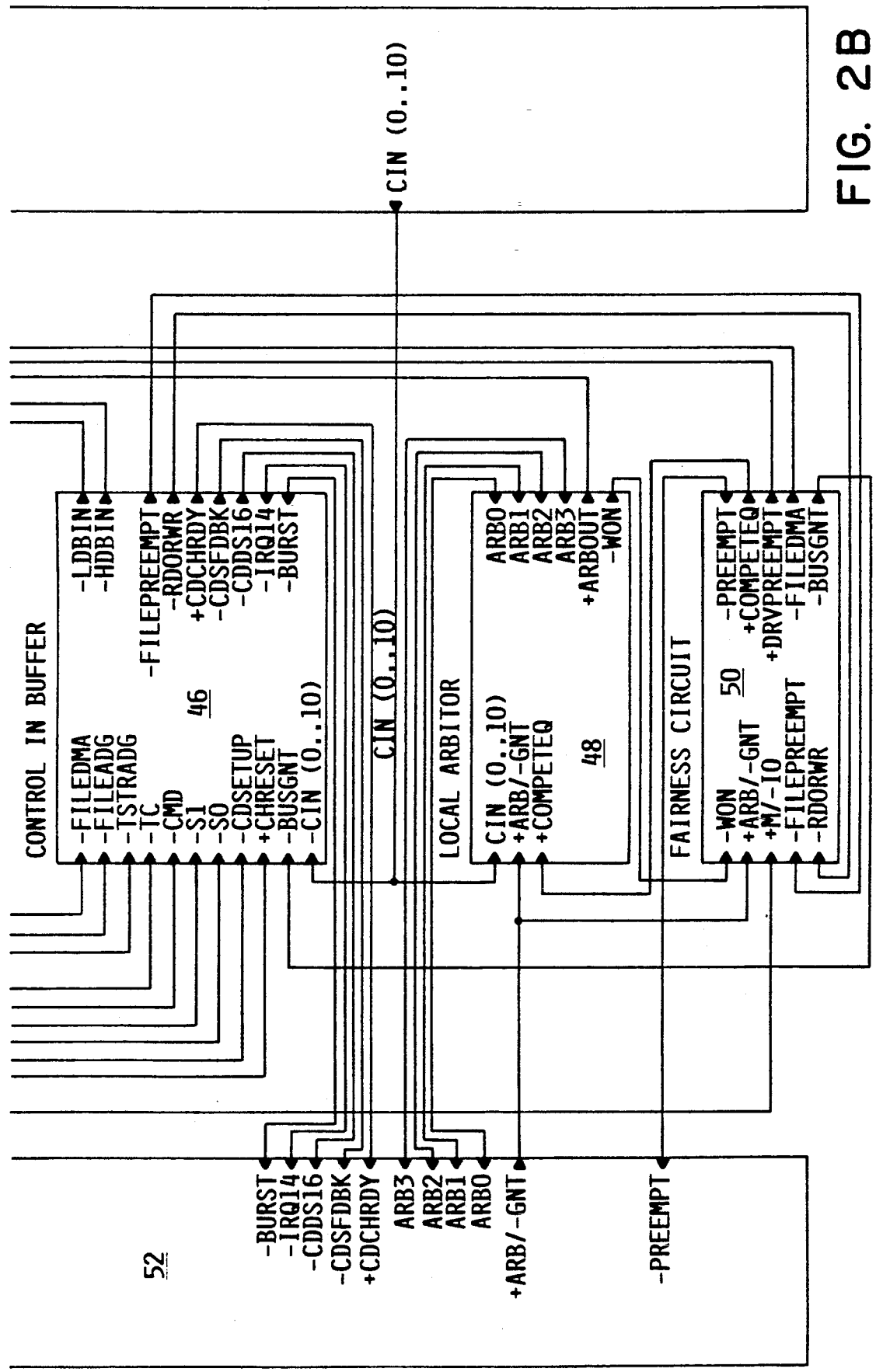

FIG. 2 further details the driver card 16. FIG. 2 shows that the driver card includes an address buffer 40, a data buffer 42, a control out buffer 44, a control in buffer 46, a local arbiter 48 and a fairness circuit 50. Also shown is the bus connector 52 to the computer 12 and connector to the cable 28. In this example, the bus connector 52 connects the driver card 16 to the Micro Channel bus of an IBM PS/2 computer. As a result, FIG. 2 also shows as inputs and outputs to and from the driver card 16, signals related to the Micro Channel of the PS/2 model computer from IBM. FIG. 2 shows which particular portion of the driver card receives a particular signal from the Micro Channel of the computer 12, the signal interrelationships between the various portions of the driver card 16, and the signals which are output from the driver card 16 both to the cable 28 and back to the Micro Channel bus of the computer 12. In a sense, this figure is also a road map of the signals that go in and out of the driver card 16 as well as a road map of the input and output signals of each portion of the driver card 16.

The driver card 16 serves several purposes including recognizing the addresses of the peripheral devices 22 attached to the receiving card 18 at the first connection 24 or via the motherboard card 20 at connection 26. The driver card 16 drives signals out to the peripheral devices 22 and receives signals back from the peripheral devices 22, generates wait states and participates in bus arbitration. The driver card 16 also responds to several signals from the bus of the computer 12. The driver card generates the CDCHRDY (Card Channel Ready) signal and the CDSFDBK (Card Channel Feedback) signal on behalf of the remotely attached peripheral devices 22 attached to the bus expansion unit. These two signals hold the bus open until the peripheral has adequate time to respond to commands sent to the particular peripheral device 22.

Figure 3:
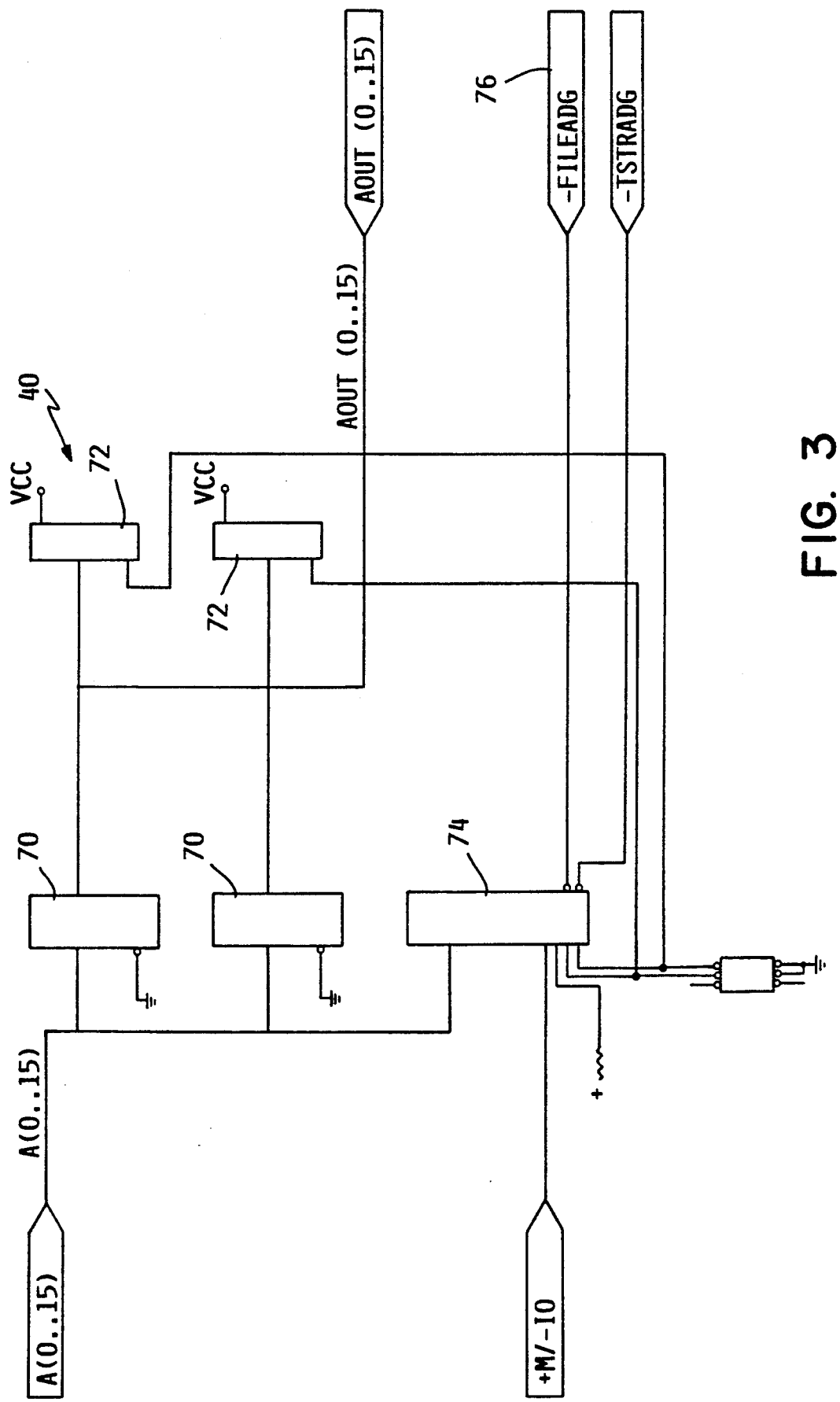
FIG. 3 is an electrical diagram of the address buffer of the driver card of the bus expansion unit.

FIG. 3 shows the address buffer 40 of the driver card 16. The address bus 62 is shown as an input to the address buffer 40. The address buffer 40 includes a pair of open collector drivers 70 and a pair of resistor networks 72. The open collectors 70 drive the signals from the address bus 62 down cable assembly 28 to the receiver card 18 and to motherboard card 20. The open collectors 70 are able to pull the address signals low if need be while the resistors are able to pull the signals high. The resistor networks are for debugging of the card so driver outputs will go high when cables are not attached. When cables are attached to the card, the terminating resistors at the receiving end cause the signal to float at the high logic state and drivers 70 pull the signals low as required. Also included as part of the address buffer 40 is an address programmable array logic device or address pal 74. Such a programmable array logic device ("pal") includes a number of gates for carrying out boolean algebra. Basically, programming such a device is well known to those in the art of circuit design as are the devices themselves. As a result, no detailed description of address pal and how to program it will be included.

The address pal 74 is programmed so that it recognizes the signals over the address bus 62 for the various peripheral devices 22 attached to either the receiver card 18 at the first connector 24 or attached to the motherboard card 20. The address pal 74 for use in a bus expansion unit 10 must be programmed to recognize the addresses of the particular peripheral attached to the bus expansion unit 10. For example, if printers are to be attached to the bus expansion unit 10, the address pal 74 must be programmed to recognize that peripheral device 22. The address pal 74 is also programmed to produce a signal indicating that the address is good. This signal is shown as FILEADG 76.

Table 1, which follows, shows the logic equations for the address PAL. The Table 1 includes these equations in the statements used to program the PAL.

TABLE 1

```
CHIP      HILODRV_U15    PAL16L2

;PINS   1     2    3    4     5     6
        SEL0  SEL1 NC   MIO   A4    A5

;PINS   7     8    9    10    11    12
        A6    A7   A8   GND   A9    A10

;PINS   13    14   15     16     17   18
        A11   A12  /FADG  /TADG  A13  A14

;PINS   19    20   21   22    23    24
        A15   VCC

STRING FILEADR ' /A15*/A14*A13*A12*/A11*A10*/A9*A8*/A7*/A6*/A5*A4'
STRING BASEADR ' /A15 * A14 * A13 * A12 * A11 * A10 * /A9 * /A8'
STRING BLKSEL0 ' /SEL1 * /SEL0'
STRING BLKSEL1 ' /SEL1 * SEL0'
STRING BLKSEL2 ' SEL1 * /SEL0'
STRING BLKSEL3 ' SEL1 * SEL0'
EQUATIONS
FADG = /MIO * FILEADR
TADG = ((/MIO * BASEADR * /A7 * /A6 * /A5 * BLKSEL0)
      + (/MIO * BASEADR * /A7 *  A6 * /A5 * BLKSEL1)
      + (/MIO * BASEADR *  A7 * /A6 * /A5 * BLKSEL2)
      + (/MIO * BASEADR *  A7 *  A6 * /A5 * BLKSEL3))
```

Figure 4:
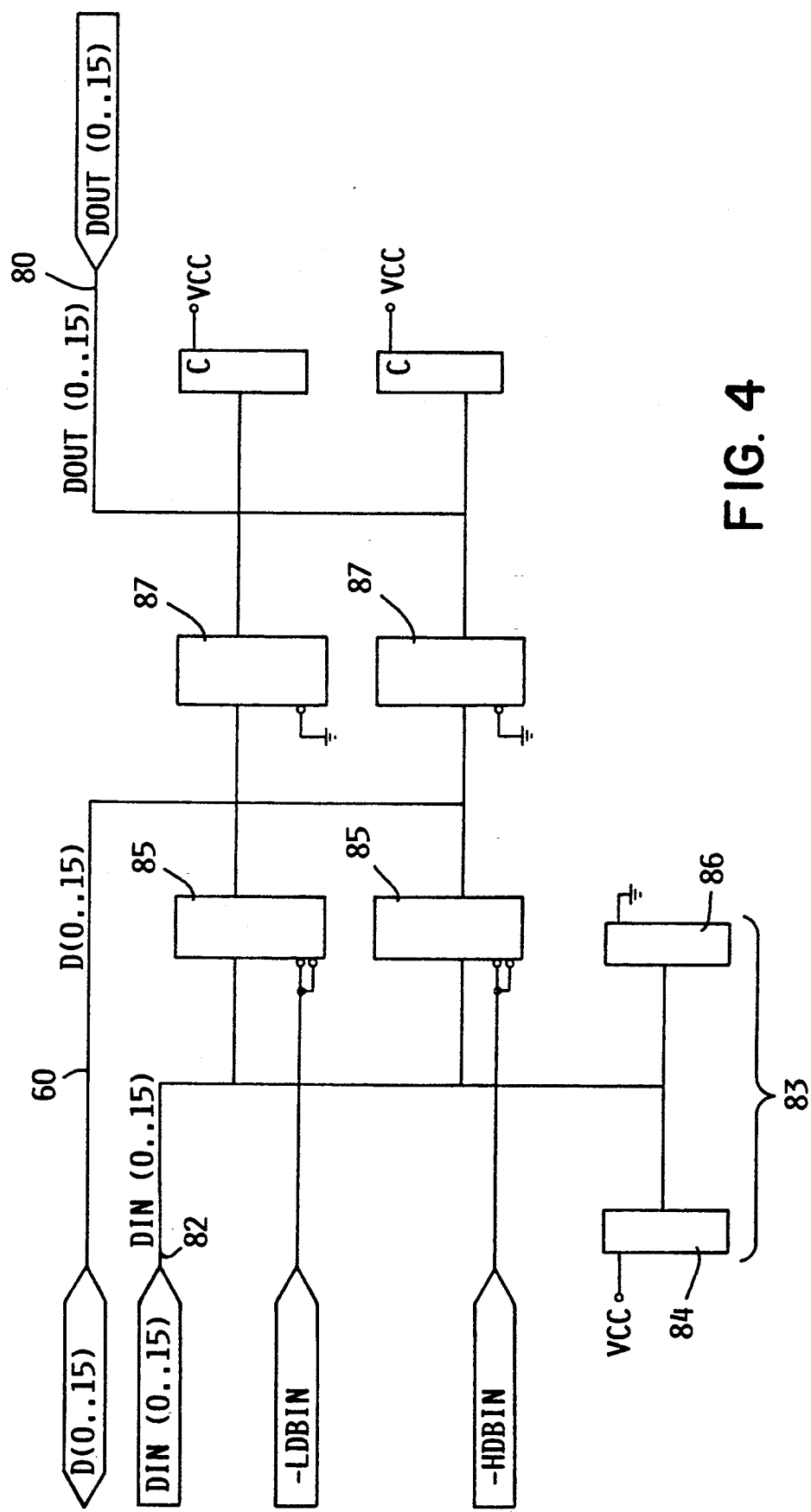
FIG. 4 is an electrical diagram of the data buffer of the driver card.
Figure 5:
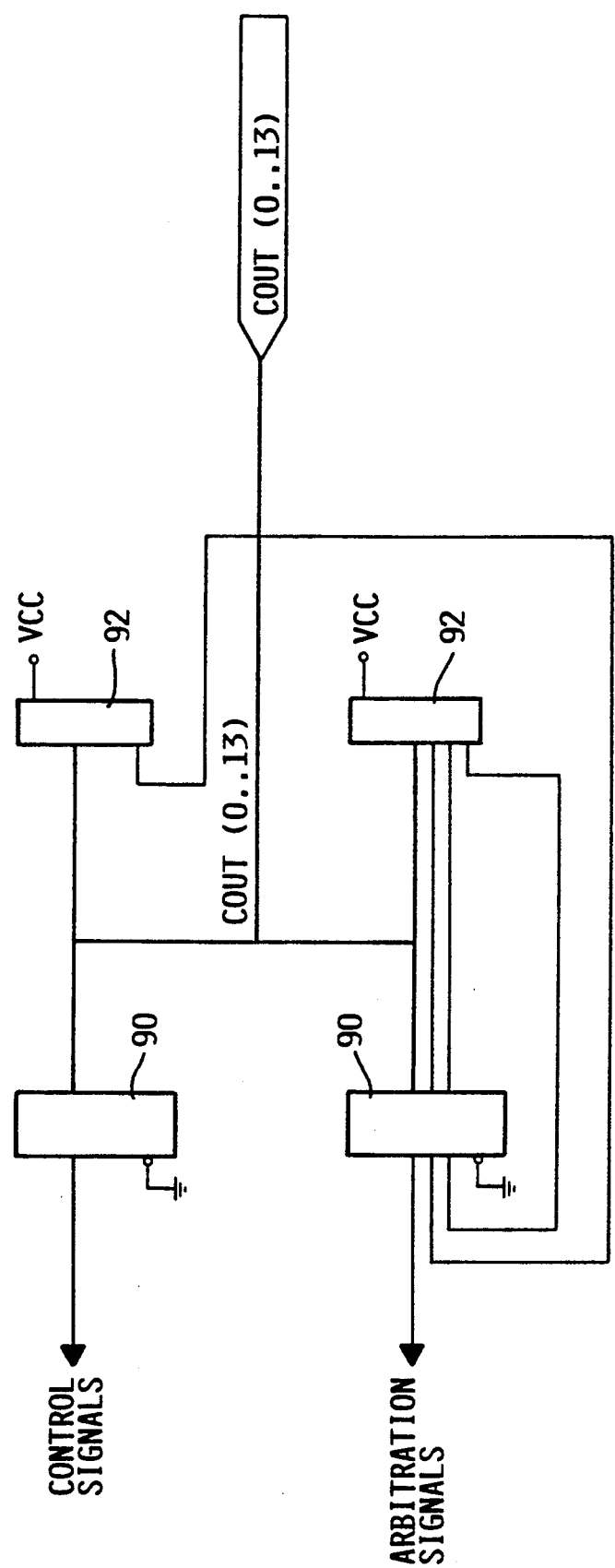
FIG. 5 is an electrical diagram of the control out buffer of the driver card.

FIG. 4 details the data buffer 42. The data bus 60 of the IBM model PS/2 is bidirectional and the natural tendency would be to preserve that architecture. However, bidirectional lines must be terminated at their characteristic impedance at both ends of the bidirectional cable. In order to limit cross talk on the data bus 60, a cable having an impedance of 65 ohm was selected. If the data axis remained bidirectional, the driver devices must then drive the combined load of the cable impedance plus the local terminator with an equivalent parallel impedance of 32 ohms. This low impedance results in high signal currents which tend to counteract efforts to control cross talk and ground noise in the bidirectional cable. Cross talk and ground noise in the cable assembly 28 may result in erroneous data being transmitted over the cable. To avoid this problem the data bus in this device was divided into a separate outbound bus 80 and a separate inbound data bus 82 on the cable 28. The outbound data bus 80 and the inbound data bus 82 are rejoined into a true bidirectional data bus by the data buffer 42 as shown in FIG. 5. This data buffer thus divides the data from a bidirectional data bus 60 between the bus of the computer 12 and the driver card 16 into the data outbound bus 80 and the data inbound bus 82. The data outbound bus 80 and the data inbound bus 82 form the portion of the cable assembly 28 which passes data between the driver card 16 and the receiver card 18. The data buffer 42 includes a pair of inbound data buffers 85 and a pair of outbound data buffers 87. The inbound data buffers 85 clear the signals and drive them onto the bus of computer 12. Outbound data buffers drive the signals out to the devices 22 on the bus expansion unit 10.

The data buffer 42 also includes a terminator network 83. For each of the data lines in the data inbound bus 82, a resistor is attached between the particular data line and VCC and a another resistor is attached between the particular data line and ground. The size of the resistors is selected so the Thevenin equivalent of the line impedance is achieved at the terminal or block 83. This totally dissipates the energy in the particular line of the data inbound bus 82 to prevent signals from reflecting back over the particular line. A similar arrangement for dissipating the power in the data outbound line 80 is located on the end of the data outbound line on the receiver card IS and will be pointed out when the receiver card is discussed later.

FIG. 5 details the control out buffer 44 of the driver card 16 of the bus expansion unit 10. The control out buffer 44 controls the outbound signals to the bus of the computer 12 and controls the arbitration signals to the bus of the computer 12. Included in the control out buffer 44 are a pair of open end collectors 90 and a pair of resistors 92. These resistors 92 and the open end collectors 92 serve to clean up the control out signals and the arbitration signals before they are sent to the bus of the computer 12. In addition, the open end collectors 92 drive the signals along the bus of the computer 12.

Figure 6A:
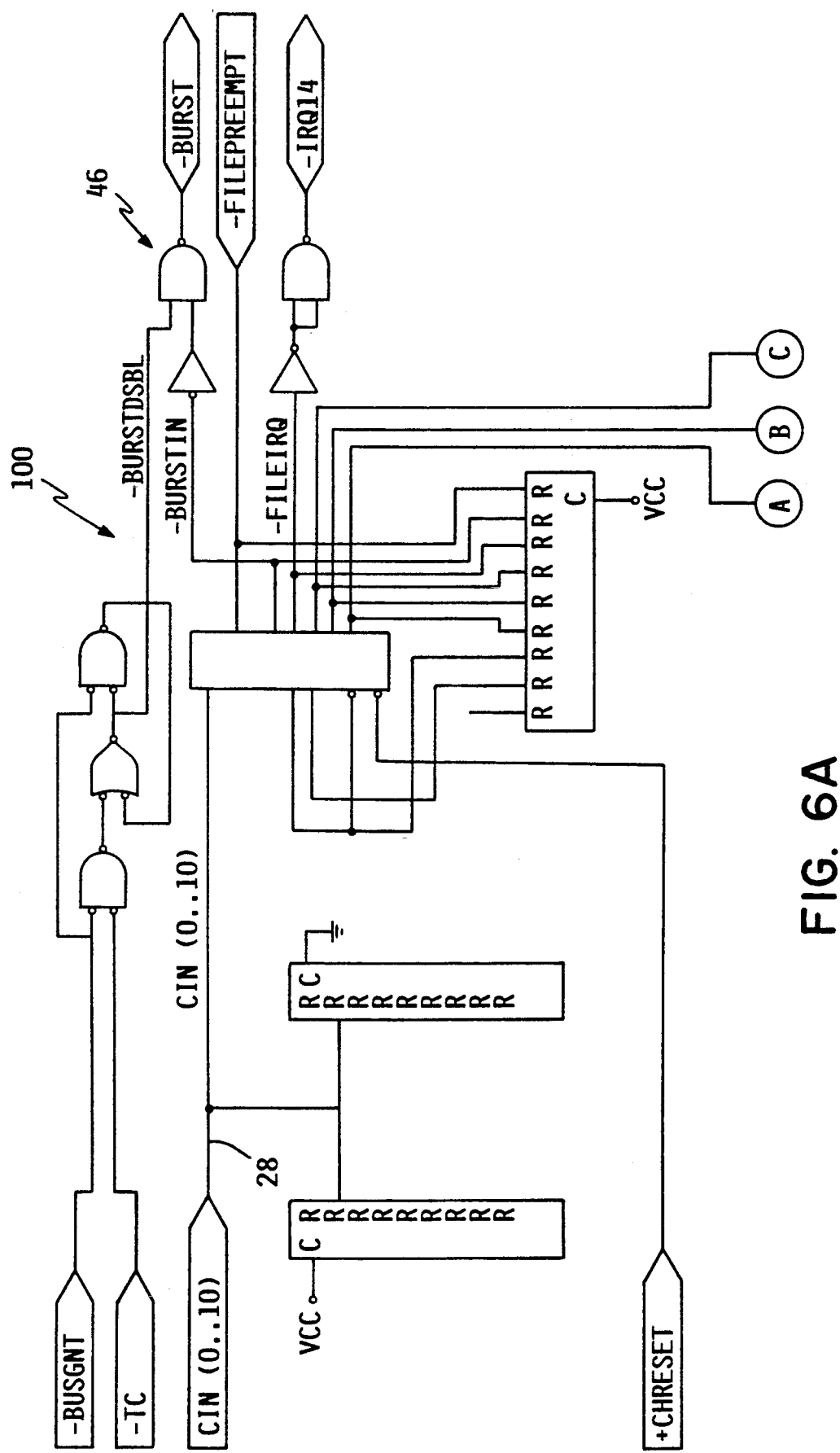
FIG. 6, consisting of FIGS. 6A and 6B, is an electrical diagram of the control in buffer of the driver card of the bus expansion unit.
Figure 6B:
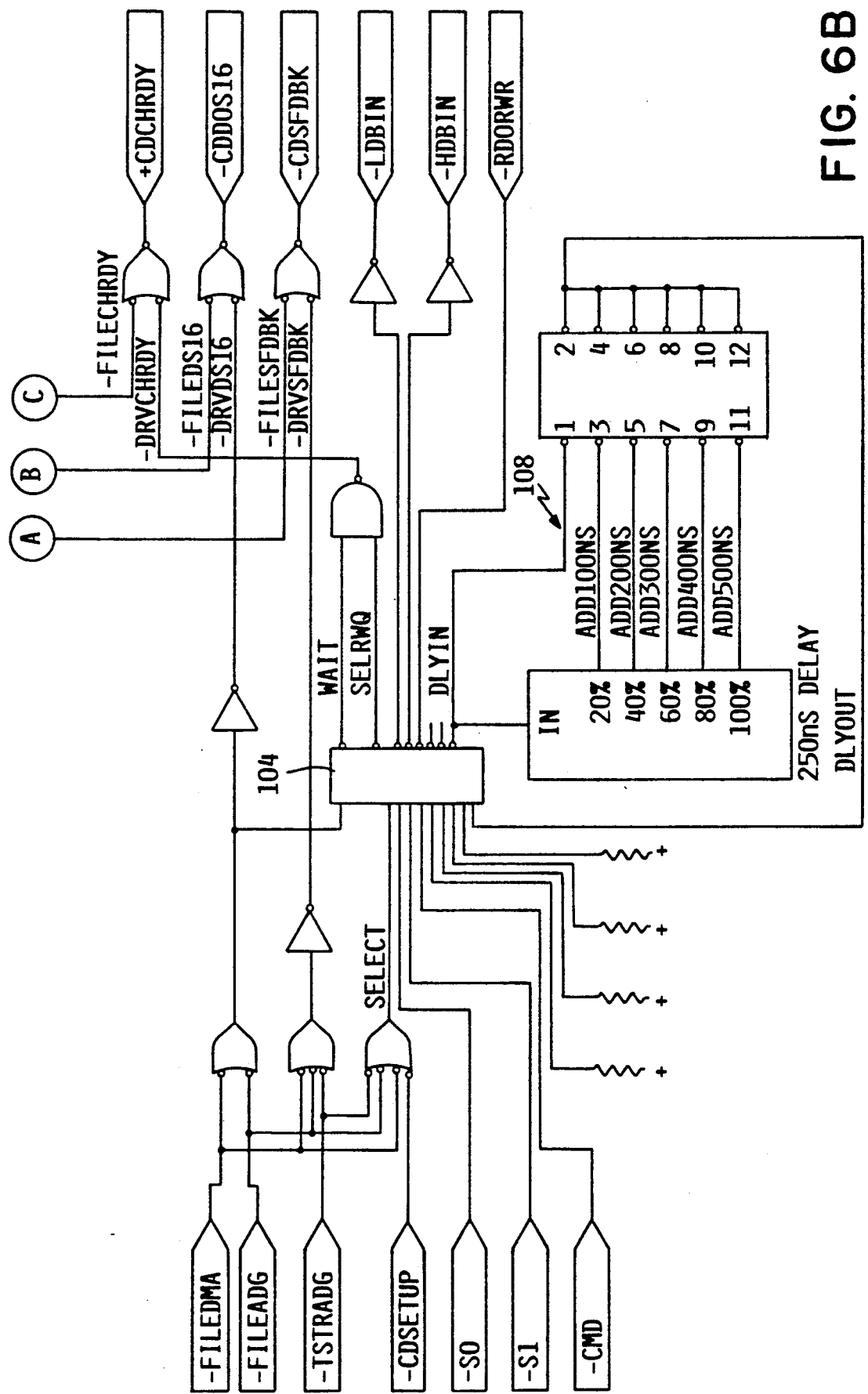

FIG. 6 details the control in buffer 46 of the driver card 16. The control in buffer 46 performs several tasks which are very important to the operation of the bus expansion unit 10. The control in buffer 46 controls the direction of data flow between the bus of the computer 12 and the bus expansion unit 10 via two signals, low data bus in and high data bus in. In addition, the control in buffer also responds for the particular peripheral device 22 that is being addressed by the computer 12 to perform a task, such as retrieving data from a disk drive. This is necessary since a computer with an asynchronous bus has a default bus cycle time. The IBM model PS/2 has a default bus cycle time of 200 ns in which a particular peripheral device must respond. When a device is within the PS/2 and directly attached to the Micro Channel bus, this time allotment is adequate. However, in the bus expansion unit 10 this time allotment would not be adequate in some instances due to signal propagation delays introduced by the driver card 16, receiver card 18 and the cable 28. In other words, adding the time necessary for the signal to pass through the driver and receiver cards and through the cable to the normal response time for the peripheral device 22 may be longer than the allotted time of 200 ns.

The control in buffer 46 includes an circuit 100 which perform the above mentioned tasks. Each of these circuits is shown with dotted lines surrounding the portion of the figure which embodies the particular circuit.

The bus of the computer 12 which is referred to as Micro Channel is designed to operate unlike buses on most computers. The default memory and the I/O cycle time for the Micro Channel bus of the computer 12, is set at 200 ns. PS/2 Models 50 and 60 automatically extend this interval to 300 ns. In that amount of time a peripheral 22 attached directly to the Micro Channel bus must recognize the cycle type, decode its address and be prepared to accept or present data on the data bus. Peripheral devices 22 which require more time in order to be prepared to either accept or present data on the data channel must activate the +CDCHRDY (Card Channel Ready) signal on the data channel in order to force the system to wait. The +CDCHRDY signal indicates that the particular peripheral addressed is not ready to place data on or receive data from the bus of the computer. Since the data channel of the Micro Channel operates asynchronously, there are no signals on the data channel, such as a clock signal, which easily lend themselves to generating repeatable wait timings with predictable duration. In other words, there is no signal which can be relied upon to trigger a wait signal (+CDCHRDY) to force the bus of the computer 12 to wait until the peripheral device 22 is ready to accept from the data bus or present data to the data bus. In addition, there is no signal which can be relied on to end a (+CDCHRDY) signal should it be implemented. For example, lost data would result if the data channel of the Micro Channel presented data to a peripheral 22 disk drive before the disk drive was prepared to receive the data.

Figure 7:
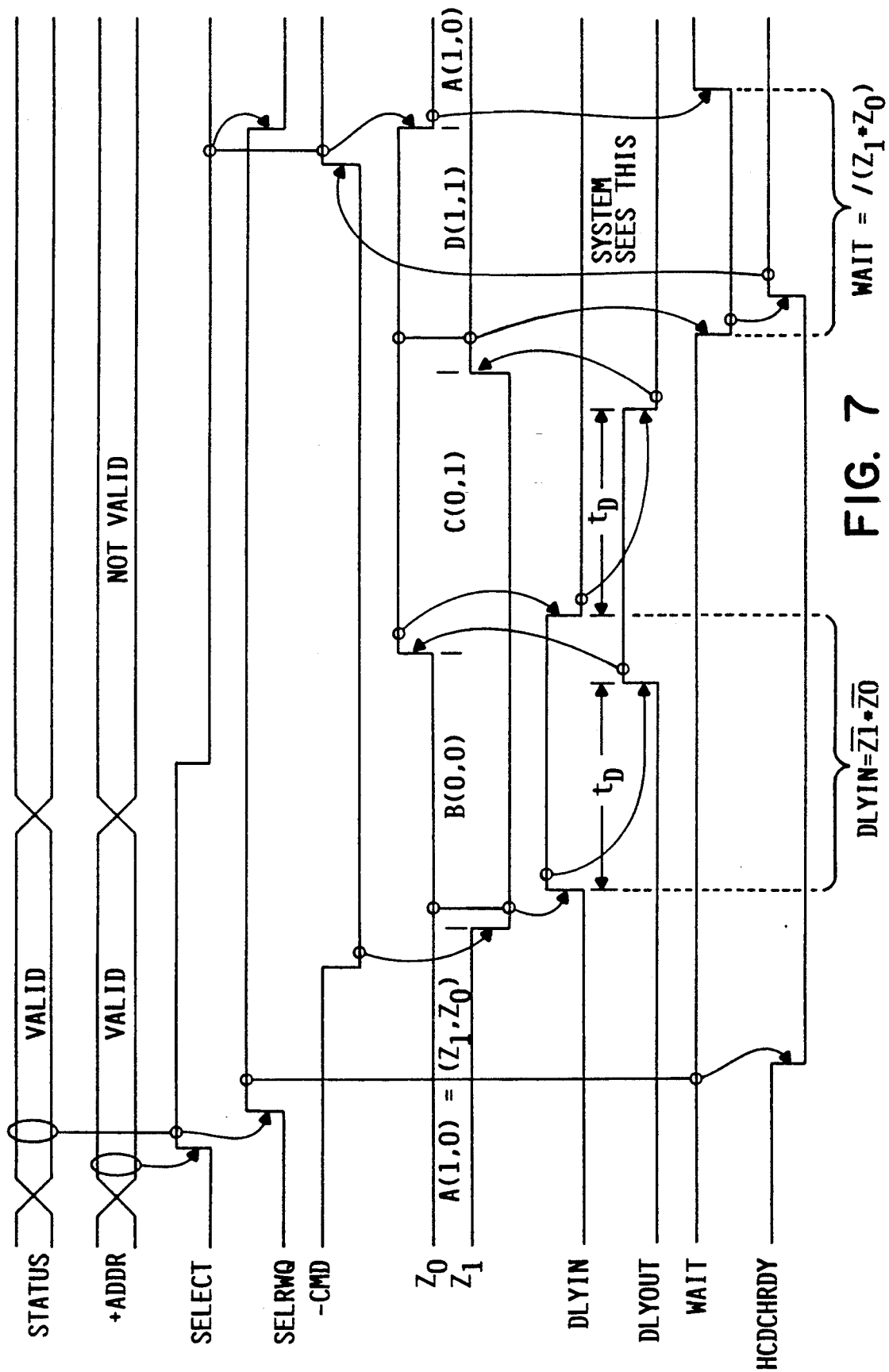
FIG. 7 is a timing diagram for a circuit shown in FIG. 6.
Figure 8:
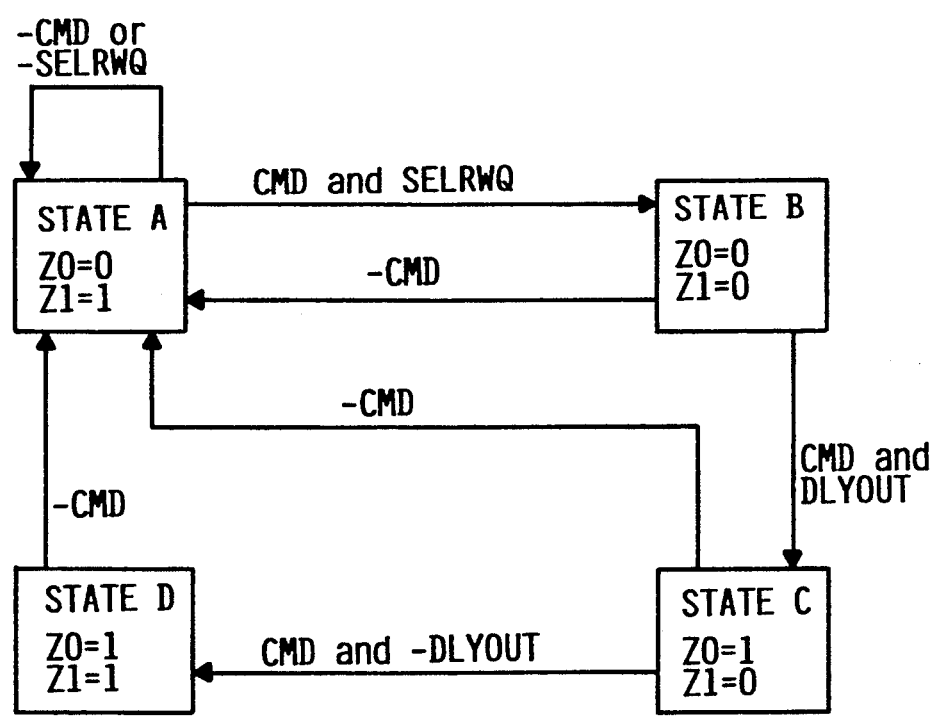
FIG. 8 is a diagram showing the states of the asynchronous state machine of the circuit shown in FIG. 6.

The direction control and answering circuit 100 solves this problem. This circuit is a level mode Moore Logic circuit. FIG. 7 shows the timing diagram for this circuit 100 and also the set of logic equations necessary to program a programmable array logic device 104 used to implement this circuit 100. The circuit includes an asynchronous state machine 106 which is depicted in FIG. 8 as well as a transparent latch, a delay line 108 and some logic around the delay line 108. FIG. 7 shows how the asynchronous state machine 106 affects the various signals to produce a wait signal.

The heart of the circuit is the asynchronous state machine which is shown in FIGS. 7 and 8. The signals used to produce the state machine are also shown in the timing diagram of FIG. 7. Basically, the circuit 100 produces two signals which are resident only in the circuit. These two signals are Z0 and Z1. Depending on the combination of these two signals, the asynchronous state machine is either in State A, B, C, or D. The signals Z0 and Z1 are driven high or low. The signals Z0 and Z1 count in two bit Grey code so that only one of the state variables is allowed to change at a time.

Inputs into the state machine 106 include −CMD, Select Address, Status and +CDCHRDY from the bus of the computer 12. The address signal indicates which device is being called and the status signal indicates the task to be performed by the device. The Select signal indicates when the combination of address and status are valid. CMD indicates that the bus of the computer is ready to receive data. CDCHRDY can be activated by a device to delay the bus cycle until the device has had time to perform a task. These signals along with a delay line 108 are used to produce the state machine 106. The signals SELRWG, Z0, Z1, DLYIN and DLYOUT are within the 100 circuit.

Now referring to the timing diagram of FIG. 7, the operation of the circuit 100 will be discussed. The states pass from one state to another in succession. Discussion of the state machine will start with the state machine in State A. In State A, Z0=0 and Z1=1. When the signal −CMD from the Micro Channel bus of computer 12 goes low, this results in Z1 changing from high to low. As a result, the state machine is in State B where Z0=0 and Z1=0. When −CMD goes low, this indicates that data should be either placed on the bus or that data must be retrieved from the bus before the −CMD goes high again indicating the end of the particular bus cycle. As a result of Z1 changing from high to low and causing State B, delay line in (DLYIN) goes from low to high, and this signal is passed through a delay line. The output of the delay line, namely delay line out (DLYOUT) is then monitored for the next event to trigger another state change. When the DLYOUT goes from low to high, indicating that the signal put into the delay line is coming out of the delay line, this is used to change Z0 from low to high. Now Z1=0 and Z0=1 which indicates state C. Also with the value of Z1 going from high to low, the signal at DLYIN goes from high to low. In effect, the front of the pulse or signal passing through the delay line directly causes the state machine to change to State C and also indirectly causes the DLYIN signal to drop from high to low. The delay line out is further monitored to trigger the next state change. When the state of DLYOUT drops from high to low, indicating the back side of the pulse passing through the delay line, the signal Z1 is changed from low to high. When Z0=1, and Z1=1 the state machine is in State D where −CMD is monitored for the next state change. In state D the computer finishes the data transfer and completes the bus cycle by driving −CMD high.

As shown in the timing diagram.. the wait signal is high during states A, B and C. The wait signal drops low during state D (Z0=1 and Z1=1). When the value of Z1 changes again, indicating the change from State D to State A, the wait signal goes high where it normally stays.

The latch function of the circuit 100 will now be discussed. This is seen with respect to the SELRWQ signal of the timing diagram. The signals that affect SELRWQ include the status signals, the select signal and the −CMD signal from the bus of the computer 12. The status signal 22 is the combination of −S0 and −S1 from the Micro Channel bus which indicate read or write bus cycles. The address signal indicates which of the peripheral devices is being called on to do a task. Once the direction control and answering circuit 100 recognizes that the address is proper, it pulls the SELECT signal high for the length of time the address signal is valid. The SELECT signal drops once the address changes, as permitted by the design of the Micro Channel or bus of the computer 12. The SELRWQ signal is the output of a transparent latch whose input is SELECT ANDed with valid status (READ or WRITE) and whose control is provided by −CMD. it follows SELECT and status during its transparent state when −CMD is high and is held constant during its latch state when −CMD is low.

When a peripheral is called to do a task it must either respond in a prescribed time which is dictated by the design of the architecture of the computer system, or pull down a signal called card channel ready (CDCHRDY) until it is ready to respond. In the case of the bus expansion unit 10, the propagation time of the signal to the peripheral can take up to half of the time prescribed by the system for responding. Due to this delay, the +CDCHRDY signal is pulled down in response to the SELRWQ signal going high when WAIT is high. +CDCHRDY goes high after the wait signal drops low in State D. The length of time the +CDCHRDY signal stays low is a function of time required for a pulse to propagate through the delay line. The length of time necessary for a pulse to propagate through the delay line is selected so that doubling of this time will be an adequate amount of time for the peripheral to respond and get the data off or on the bus to the computer 12. Once the +CDCHRDY signal goes high the computer system waits for a prescribed time to assure that the data on the bus is valid and then the system brings the −CMD signal high again. When the −CMD goes high, the bus cycle is over.

This particular circuit has several advantages associated with it. The state machine is designed so that all timing pulses are flushed out of the delay line before permitting the current bus cycle to proceed. This self-flushing action is critical because it prevents the residue of delay timing pulses from affecting subsequent bus cycles. That is, the timing circuit is flushed out before the computer 12 is allowed to complete the current cycle so there is no possibility for future cycles to be affected by what is still in the delay line from the current cycle. This is important because the Micro Channel overlaps cycles, i.e. it presents the next address and status shortly after −CMD goes low so that the next cycle is already in progress when −CMD goes low so that the next cycle is already in progress when −CMD returns high and an adapter has no time between cycles to allow its wait generator to prepare to go again. Also, since the circuit uses an asynchronous state machine, it avoids all the setup time violations and erratic operation that would be inevitable with synchronous circuits that are clocked from a signal which is asynchronous to all the other signals on the bus. This particular circuit allows peripheral devices with slow bus-access speed to be attached to the bus expansion unit 10. This circuit acts to selectively pace the Micro Channel for peripheral device which require addition to complete bus cycles. In the case of peripheral devices attached to the bus expansion unit 10, the additional time required is due to signal propagation delays associated with extending the bus of the computer 12 to a position outside the computer 12.

The direction of flow for a particular bus cycle is generally assumed to be flowing outward from the computer 12. This is changed only during operations that indicate that data will be received from the peripheral device and is determined from the status signals which determine what kind of operation is to be performed.

In operation, when a peripheral device 22 is the target of a bus cycle, the transparent latch holds that selection status valid throughout the bus cycle. The input to the latch is signal D0, which exists only within the control in PAL 104. Signal D0 is derived from the SELECT signal ANDed with read and write conditions decoded from −S0 and −S1 (status) signals. SELECT is true whenever an expansion peripheral is the target of a bus cycle. As seen in FIG. 7, the output of the latch SELRWQ (select read write Q) follows D0 whenever −CMD (command) is high, but SELRWQ holds the current value of D0 when −CMD falls. This is necessary because many of the control signals on the data channel of the Micro Channel bus are allowed to change after the falling edge of −CMD. The result is that SELRWQ goes high as soon as the bus address and status are recognized, and it remains high until the rising edge of −CMD and the conclusion of the bus cycle.

Table 2, which follows, shows the logic equations for the control in PAL 104.

TABLE 2

| CHIP | HILODRV_U25 | PAL16L8 | | | | |
|---|---|---|---|---|---|---|
| ;PINS | 1 | 2 | 3 | 4 | 5 | 6 |
| | DRVDS16 | SELECT | IS0 | IS1 | CMD | NC |
| ;PINS | 7 | 8 | 9 | 10 | 11 | 12 |
| | NC | NC | NC | GND | DLYOUT | DLYIN |
| ;PINS | 13 | 14 | 15 | 16 | 17 | 18 |
| | /Z1 | /Z0 | /RDORWR | HDBINQ | LDBINQ | SELRWQ |
| ;PINS | 19 | 20 | 21 | 22 | 23 | 24 |
| | WAIT | VCC | | | | |

STRING D0 ' (( SELECT * IS0 * /IS1) + ( SELECT * /IS0 * IS1))'
STRING Q0 ' SELRWQ '
STRING D1 ' ( SELECT * IS0 * /IS1) '
STRING Q1 ' LDBINQ '
STRING D2 ' ( LDBINQ * DRVDS16) '
STRING Q2 ' HDBINQ '
EQUATIONS
/Q0 = ( CMD * /D0) + (/CMD * /Q0) + (/Q0 * /D0)
/Q1 = ( CMD * /D1) + (/CMD * /Q1) + (/Q1 * /D1)
/Q2 = ( CMD * /D2) + (/CMD * /Q2) + (/Q2 * /D2)
Z0 = (/CMD * DLYOUT * /Z1) + (/CMD * Z0)
Z1 = ( CMD) + (/CMD * Z1 * Z0) + (/CMD * /DLYOUT * Z0)
    + (/CMD * /SELRWQ * Z1)
/DLYIN = /(/Z1 * /Z0)
/WAIT = ( Z1 * Z0)
RDORWR = (IS0 * /IS1) + (/IS0 * IS1)

Figure 9:
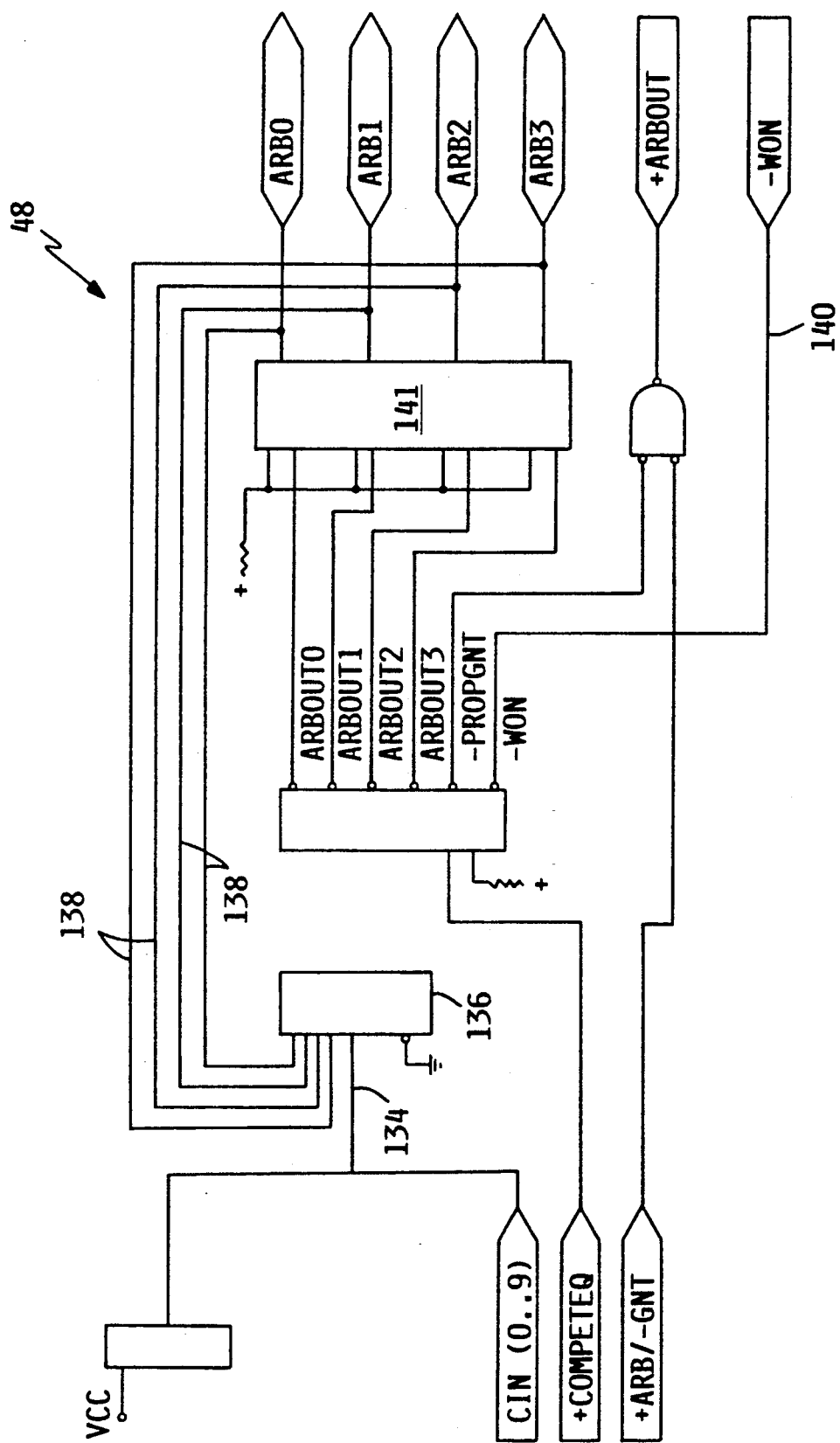
FIG. 9 is an electrical diagram of the local arbiter of the driver card.

FIG. 9 shows the local arbiter 48 of the bus extension circuit 10. The local arbiter 48 is housed on the driver card 16. The local arbiter 48 includes an arbitration program module array logic device 132 which performs DMA arbitration on behalf of peripheral devices 22 connected to the bus expansion unit 10 and decides when expansion bus peripheral devices will participate in DMA operations, as denoted by the −WON signal going low. Table 3, which follows, shows the logic equations for the arbiter PAL 132.

162 used to terminate the address signals passing over the cable 28. Basically, resistor network 162 on the address buffer 152 of the receiver card 18 mirrors the resistor network on the data buffer 42 of the driver card 16.

The address buffer 152 also includes a pair of receiver buffers 164. The receiver buffers 164 receive the signals

TABLE 3

```
CHIP    HILODRV_U6    PAL16L8

;PINS   1        2        3        4        5        6
        FBKARB0  FBKARB1  FBKARB2  FBKARB3  FILEARB0 FILEARB1

;PINS   7        8        9        10       11       12
        FILEARB2 FILEARB3 COMPETEQ GND      NC       NC

;PINS   13       14       15       16       17       18
        WONH     /WON     /PROPGNT ARBOUT3  ARBOUT2  ARBOUT1

;PINS   19       20       21       22       23       24
        ARBOUT0  VCC

EQUATIONS
/WONH = (/COMPETEQ + (/FBKARB3 * FILEARB3) + (/FBKARB2 * FILEARB2)
    + (/FBKARB1 * FILEARB1) + (/FBKARB0 * FILEARB0))
 PROPGNT = (FILEARB3 * FILEARB2 * FILEARB1 * FILEARB0) + WONH
/ARBOUT0 = /COMPETEQ + FILEARB0 + (/FBKARB3 * FILEARB3)
    + (/FBKARB2 * FILEARB2) + (/FBKARB1 * FILEARB1)
/ARBOUT1 = /COMPETEQ + FILEARB1 + (/FBKARB3 * FILEARB3)
    + (/FBKARB2 * FILEARB2)
/ARBOUT2 = /COMPETEQ + FILEARB2 + (/FBKARB3 * FILEARB3)
/ARBOUT3 = /COMPETEQ + FILEARB3
```

The driver card 16 also includes the fairness circuit 50 which will now be discussed with respect to FIG. 2. The fairness circuit essentially makes sure that one of the peripheral devices 22 does not always "hog" the bus. This prevents the particular peripheral with the highest priority from dominating use of one bus. The won signal from the local arbiter 48 is also used to determine when an expansion bus peripheral has won a bus arbitration and is now the target of DMA cycles on the bus.

Figure 10A:
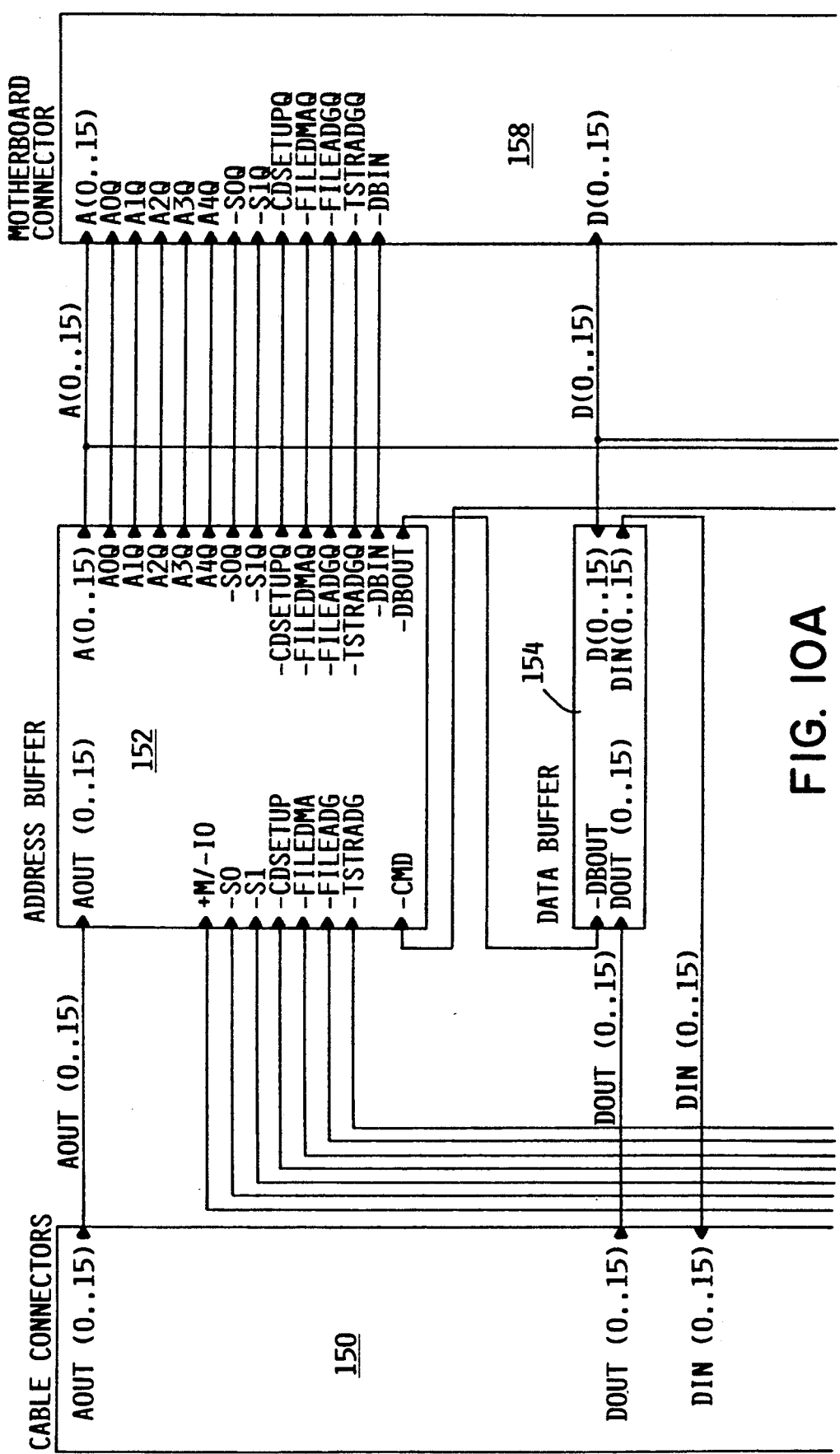
FIG. 10, consisting of FIGS. 10A, 10B and 10C, is an index of the electrical signals of the of the receiver card of the bus expansion unit.
Figure 10B:
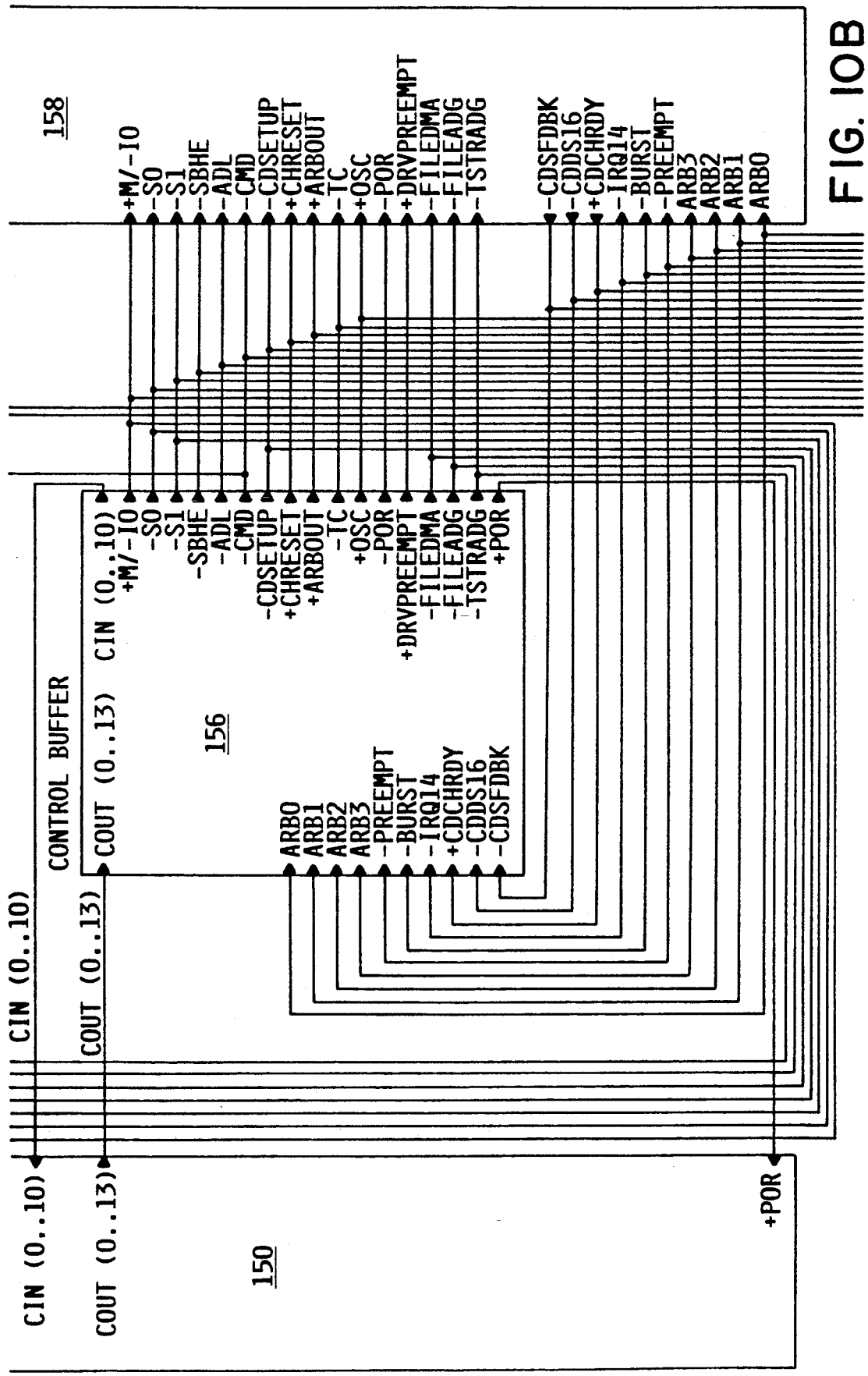
Figure 10C:
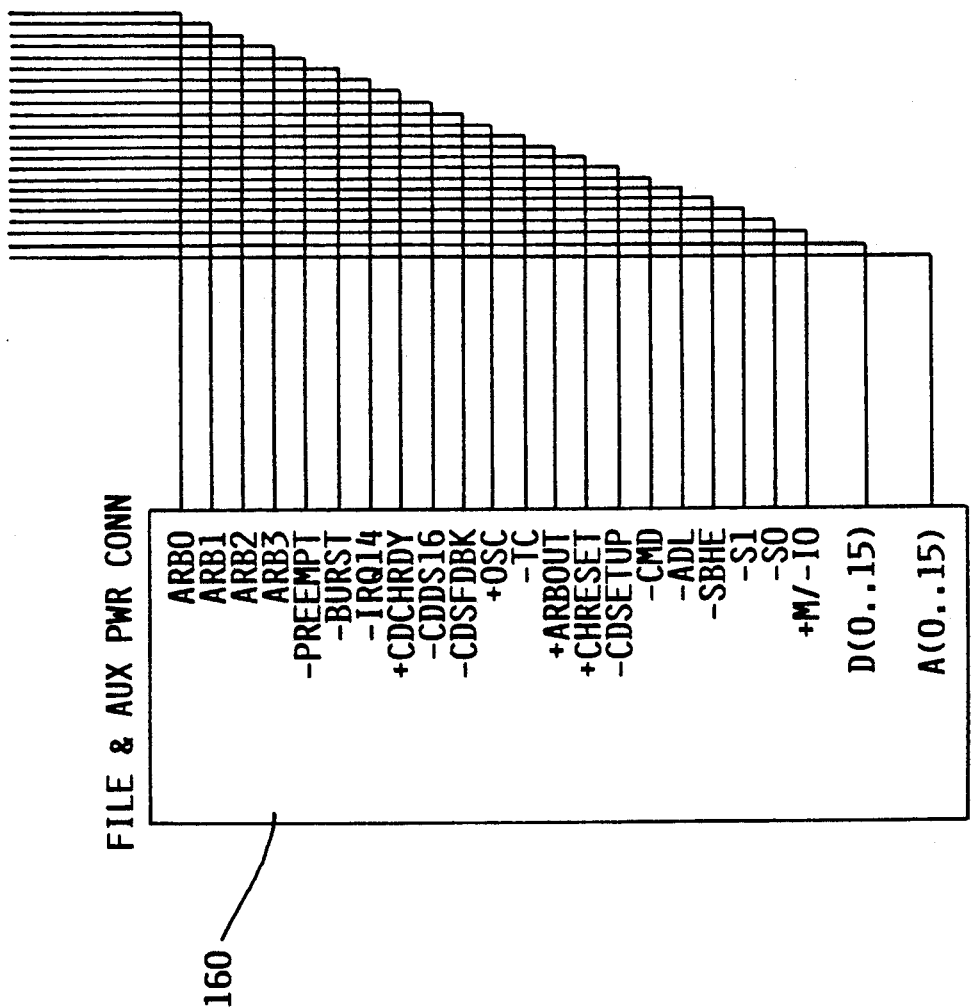
Figure 13A:
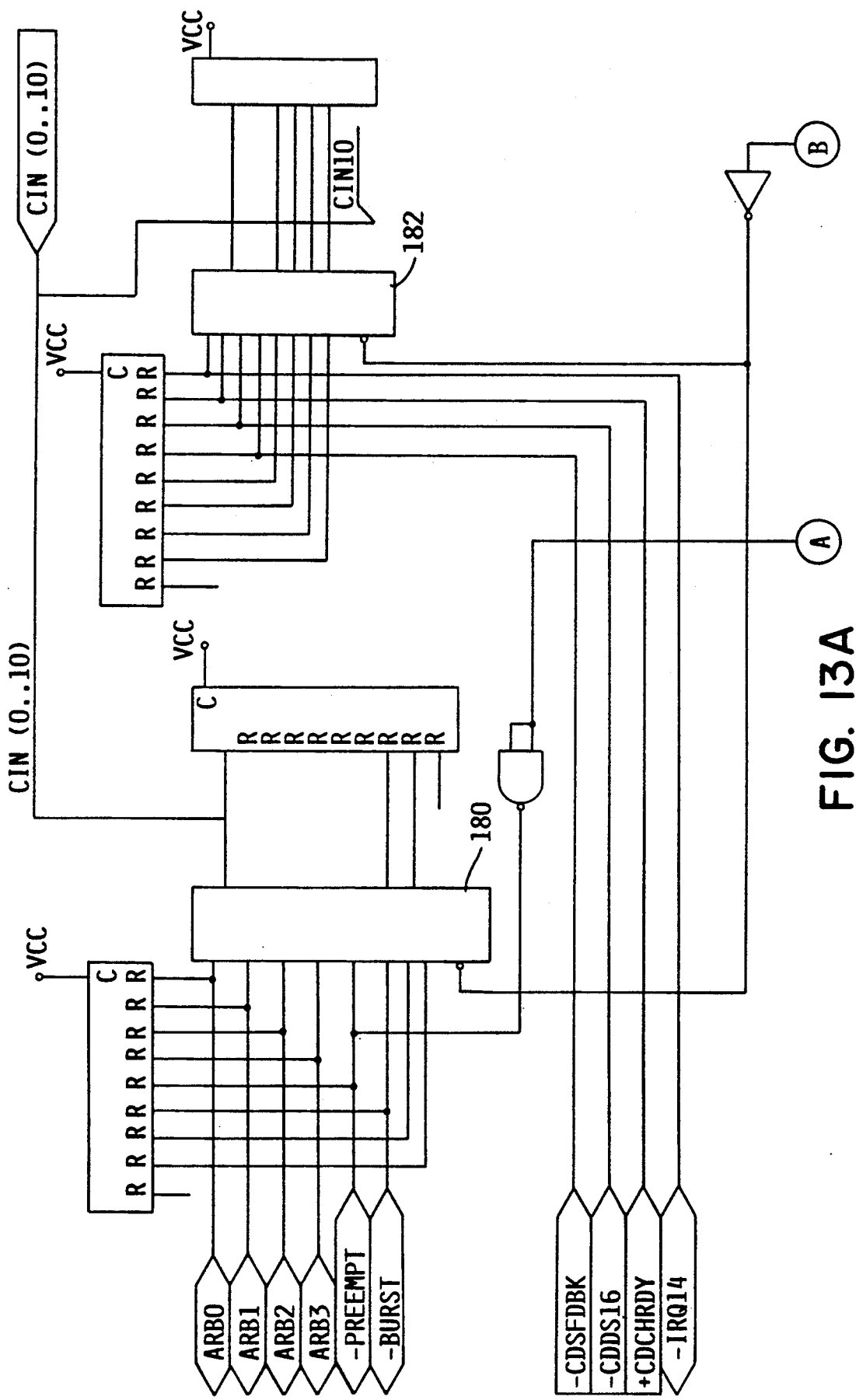
FIG. 13, consisting of FIGS. 13A and 13B, is an electrical diagram of the control buffer of the receiver card.
Figure 13B:
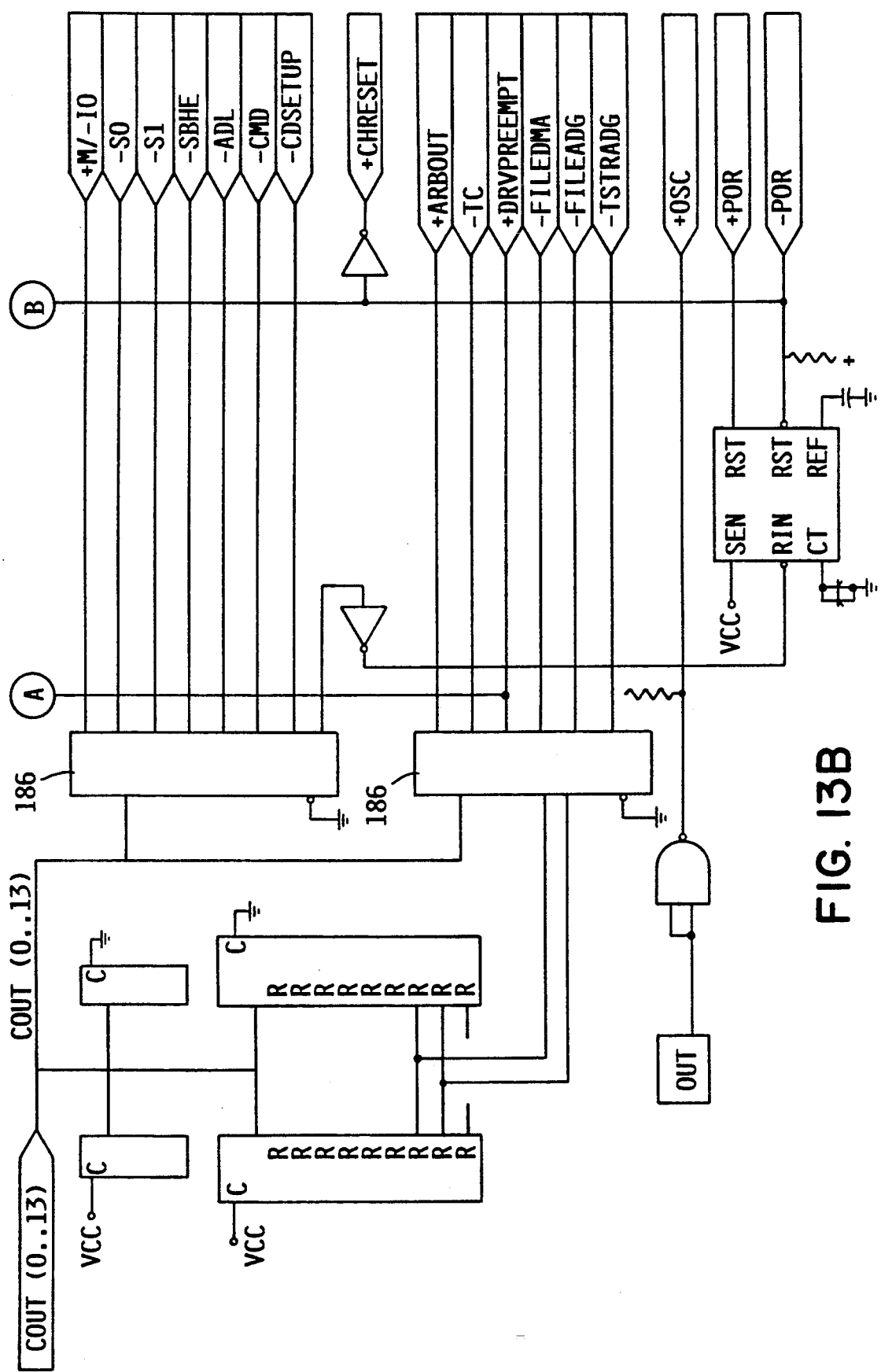

FIG. 10 shows the receiver card 18 and its various parts. Receiver card 18 includes a cable connection portion 150, an address buffer 152, a data buffer 154, a control buffer 156, a motherboard connector 158 and a file and auxiliary power connector portion 160. FIG. 13 shows the portions of the receiver board 18 as well as the signals that pass between every portion of the receiver board 18. In a sense this figure is a road map or index for the entire receiver card 18.

Figure 11A:
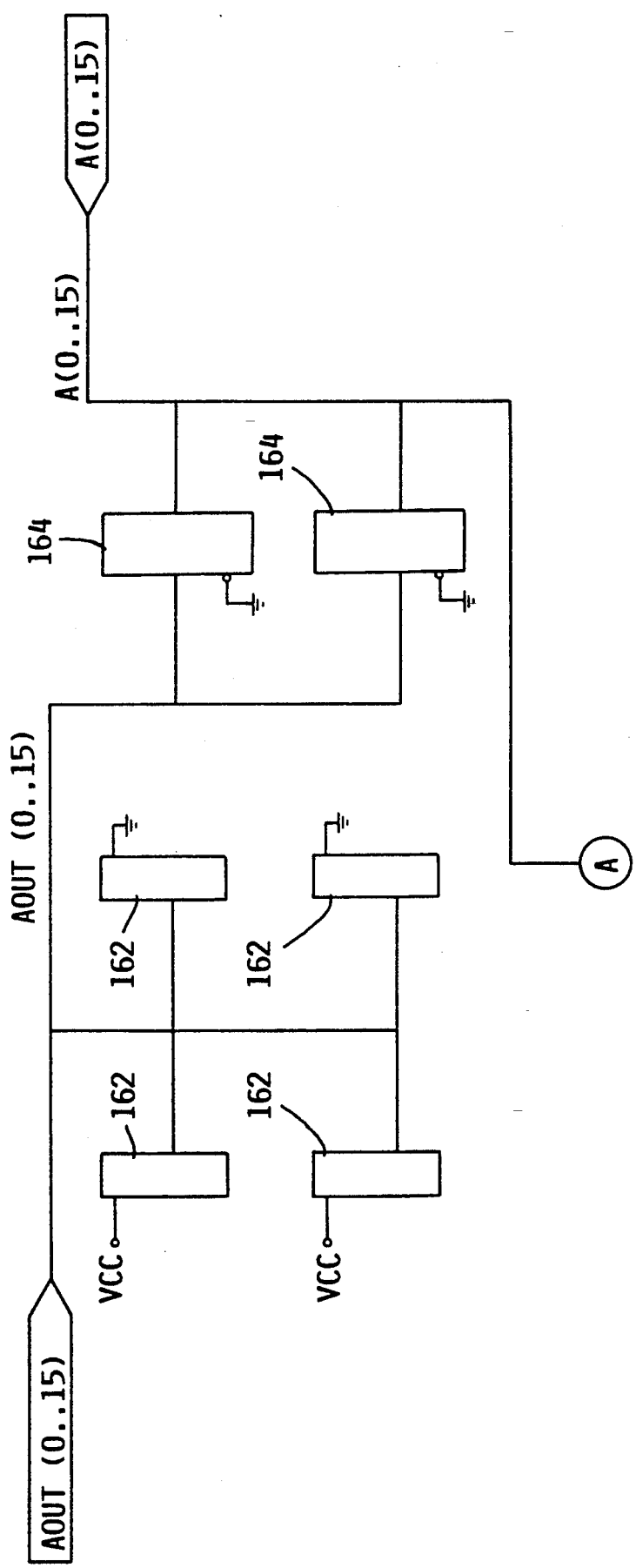
FIG. 11, consisting of FIGS. 11A and 11B, is an electrical diagram of the address buffer of the receiver card.
Figure 11B:
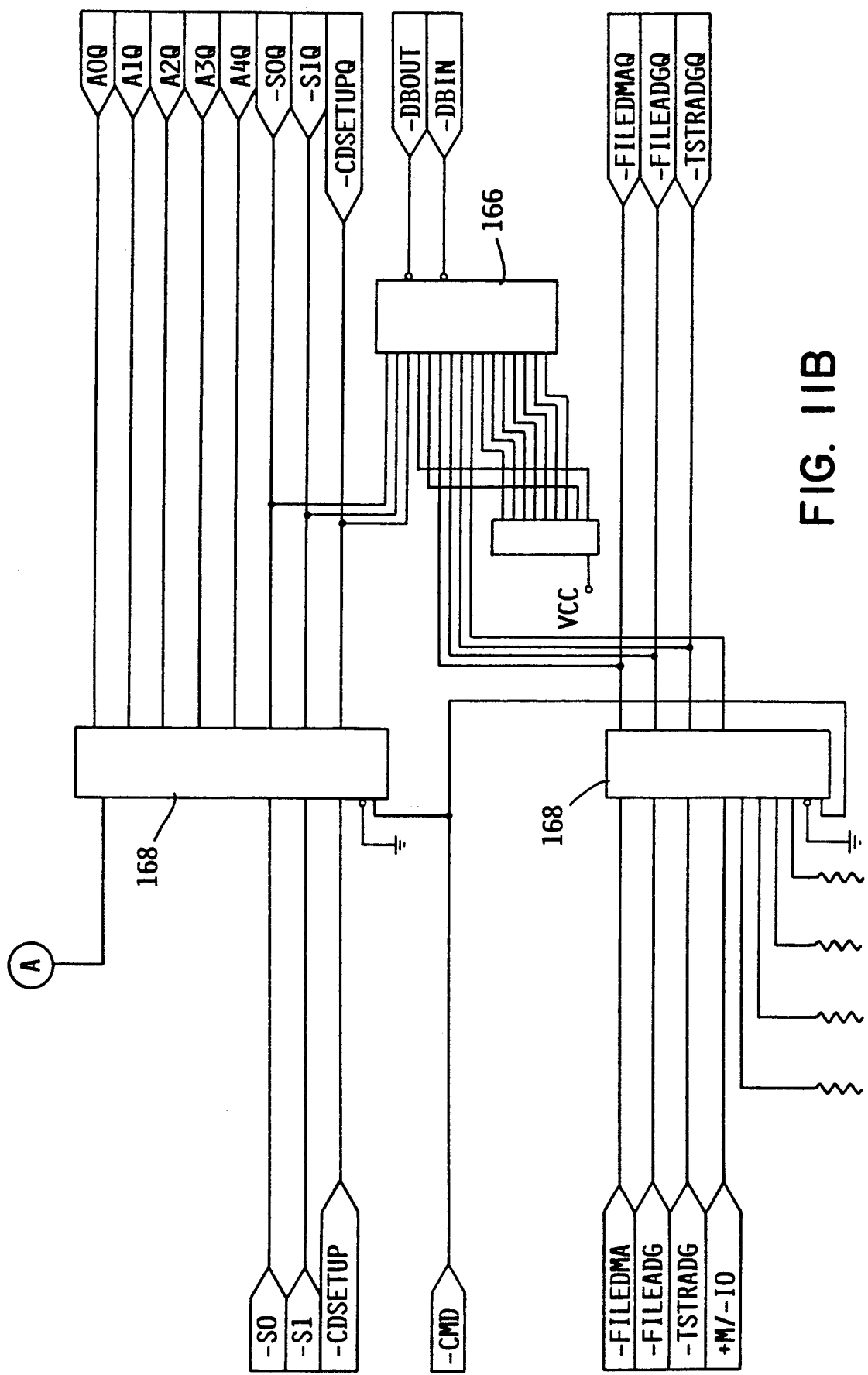

FIG. 11 shows the address buffer 152 for the receiver card 18. The address buffer includes resistor network from the cable 28 and clean up the signals for use on the rest of the receiver card. The address buffer 152 also includes a data bus operation program array logic device 166. This data bus operation pal 166 determines the direction the data will flow on the connector 28. As mentioned earlier, the direction of signals is usually determined to be out from the computer 12 unless an exception is noted. The exceptions are determined by monitoring the status (signals S0 and S1) for read operations which will indicate that the data will be flowing toward the computer 12. The address bus 152 also includes a pair of transparent latches 168 which hold control signals feeding into 166. Table 4 which follows includes the logic equations for the data bus operation PAL 166.

TABLE 4

```
CHIP    HILORCV_U19    PAL16L2

;PINS   1      2     3         4         5       6
        /S0Q   /S1Q  /CDSETUPQ /LATECMD  /CMD    /FILEDMAQ

;PINS   7         8         9      10    11  12
        /FILEADGQ /TSTRADGQ MIOQ   GND   NC  NC

;PINS   13    14    15      16      17    18
        NC    NC    /DBIN   /DBOUT  NC    NC

;PINS   19    20    21    22    23    24
        NC    VCC

STRING READ '(/S0Q * S1Q)'
EQUATIONS
DBOUT = /(( CDSETUPQ + FILEDMAQ + FILEADGQ + TSTRADGQ) * /MIOQ * READ)
DBIN  = ( CDSETUPQ + FILEDMAQ + FILEADGQ + TSTRADGQ) * /MIOQ * READ
```

Figure 12:
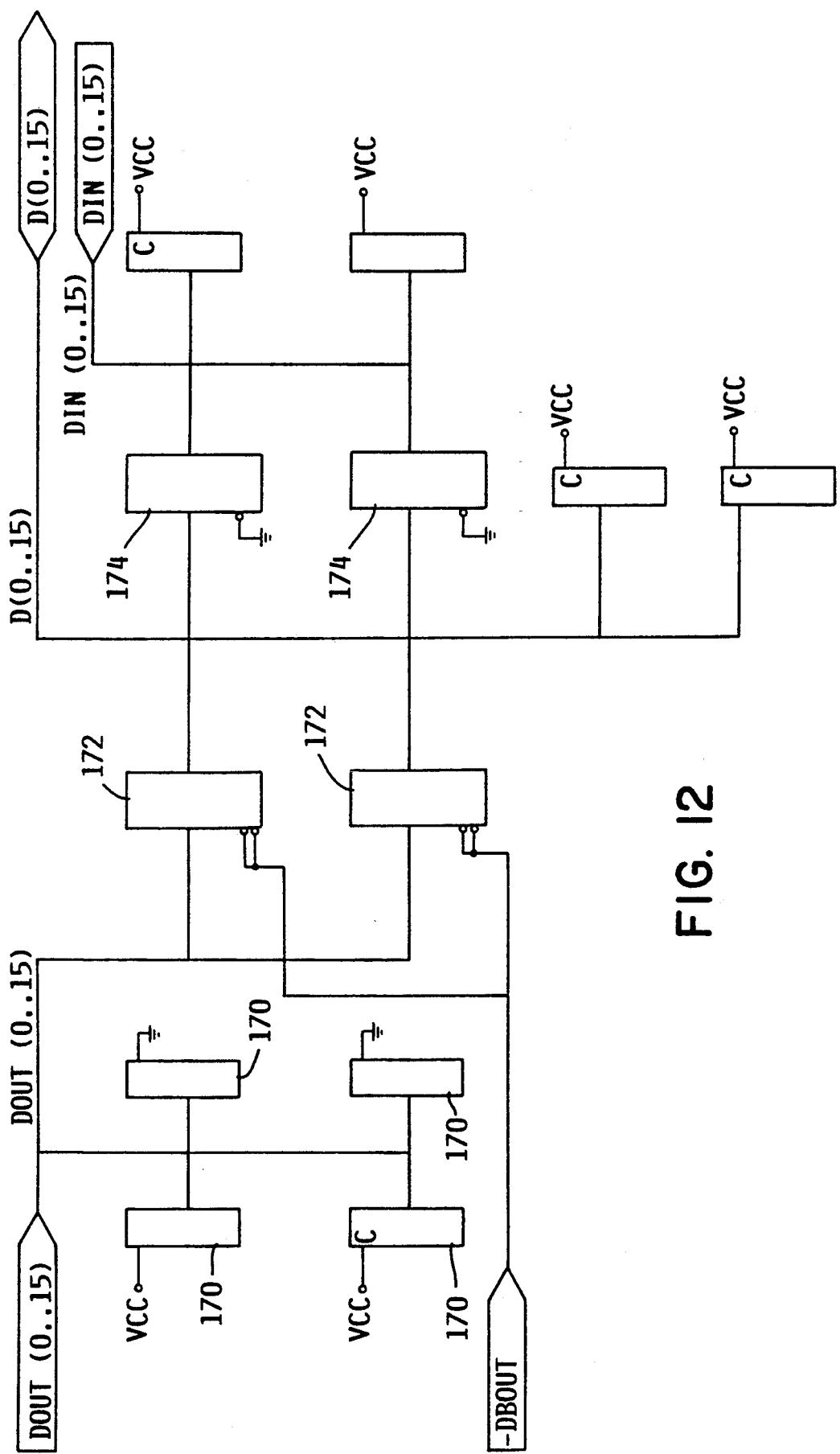
FIG. 12 is an electrical diagram of the data buffer of the receiver card of the bus expansion unit.

FIG. 12 shows the data buffer 154. The data buffer includes an array of resistors 170 for terminating the data signals, a pair of receiver buffers 172 and a pair of driver buffers 174. The resistors are in an array identical to the array of the address buffer 152 of the receiver card. The receiver buffers 172 receives the data signals and essentially remove the unwanted noise from the signals. These buffers essentially clean up the signal. The driver buffers 174 take the inbound data from expansion peripherals and drive it down the DIN line to the driver card 16.

FIG. 13 shows the control buffer 156 of the receiver card 18. Basically, the control buffer 156 receives the control signals from the cable 28 and drives the control signals to the peripherals which are attached to either the motherboard card 20 or attached to the connector 24 on the receiver card 18 for a peripheral device 22. The control buffer 156 includes a first driver buffer 180 and a second driver 182. Each of these driver buffers clean up the logic signals and drive the signals into the driver card and ultimately into the Micro Channel or bus of the computer 12. The control buffer also contains an array of resistors 184 which terminate the signals upon their arrival at the control buffer 156. The control buffer also includes a pair of buffers for cleaning up the signals and sending the signals to the peripherals 22. The outbound control signals are shown at location 186 and the inbound control signals are shown at location 188.

The present invention and the best mode for practicing it has been described. It is to be understood that the foregoing description is illustrative only and that other means and techniques can be employed without departing from the full scope of the invention described in the appended claims.

What we claim is:

1. A bus expansion unit for extending a bus of a computer system having a fixed number of slots for peripheral devices to allow additional peripheral devices beyond the fixed number of slots to be attached to the bus of the computer system, said computer system having an asynchronous bus cycle and each peripheral attached to said bus having an unique address, said computer requiring a response when a selected peripheral cannot accomplish a task in an amount of time allocated by said asynchronous bus cycle, said bus expansion unit comprising:
   a bus connector for coupling said expansion unit to said bus;
   receiving means, connected to said bus connector, for receiving communications on said bus, each said communication being intended for a respective selected peripheral device, each said communication including the address of the respective selected peripheral device for which it is intended;
   recognition means, connected to said receiving means, for determining whether the address contained in a communication on said bus corresponds to the address of a peripheral attached to the bus expansion unit and for decoding bus cycle status;
   select signal means, responsive to the recognition means, for producing a select signal indicating that the address of a peripheral contained in a communication on said bus corresponds to the address of a peripheral attached to the bus expansion unit, said signal being produced for a length of time the computer system indicates the address is valid; and
   asynchronous means, connected to said select signal means and to said bus connector, for activating a not ready signal in response to the production of the select signal, said not ready signal being activated for an amount of time necessary for the selected peripheral attached to the bus expansion unit to respond to the computer when the selected peripheral cannot accomplish a task within the allocated amount of time.

2. The bus expansion unit of claim 1 further comprising:
   means for initiating a communication on said bus on behalf of a peripheral device; and
   arbitration means for determining which of the peripheral devices attached to the bus expansion unit or to the computer bus is entitled to initiate a communication on the bus when more than one of the peripherals is ready to initiate a communication on the bus.

3. The bus expansion unit of claim 1 wherein said asynchronous means further comprises:
   means for latching the select signal while a CMD signal is active, the active CMD signal indicating that the bus is ready to receive data;
   means for producing a delay signal into a delay line in response to the CMD signal becoming active; and
   means for monitoring the output of the delay line to end the delay signal input to the delay line when the beginning of the delay signal is output from the delay line, said means for monitoring also indicating when the end of the delay signal is output from the delay line.

4. The bus expansion unit of claim 3 further comprising:
   means for deactivating the CMD signal in response to the end of the delay signal being output from the delay line, the deactivation of the CMD signal indicating that a peripheral attached to the bus expansion unit is ready to proceed with the bus cycle.

5. The bus expansion unit of claim 1 wherein said asynchronous means further comprises:
   an asynchronous state machine for directing the controller of the computer to delay the ending of the bus cycle until the end of said amount of time necessary for the selected peripheral to respond to the computer.

6. The bus expansion unit of claim 5 wherein said asynchronous state machine is controlled by a delay signal passing through a delay line.

7. The bus expansion unit of claim 6 wherein the asynchronous state machine further comprises:
   means for producing a pulse;
   mechanism for inputting the pulse into a delay line;
   mechanism for ending the pulse input to the delay line in response to the beginning of the pulse being output from the delay line; and
   mechanism for delaying the selected signal until the end of the pulse input to the delay line is output from the delay line.

8. The bus expansion unit of claim 7 further comprising:
   means for initiating a communication on said bus on behalf of a peripheral device; and
   arbitration means for determining which of the peripheral devices attached to the bus expansion unit or to the computer bus is entitled to initiate a communication on the bus when more than one of the peripherals is ready to initiate a communication on the bus.

9. An apparatus for expanding the bus of a computer having a bus cycle which is asynchronous, said computer system having a fixed number of slots for peripheral devices to allow peripheral devices to the attached to the bus of the computer system, said computer also having an arbitration circuit on the bus for determining which of the peripheral devices attached to the bus is entitled to initiate a communication on the bus, said computer producing status signals and address signals for directing instructions to devices attached to the bus, the computer producing a select signal which identifies a selected peripheral attached to the bus, a transfer enable signal when the bus is to transfer information and the computer having a not ready signal that can be activated when a selected device attached to the bus is not ready to place or read data from the bus of said computer, said bus cycle ending after a specified time if said signal indicating that the device is not ready to place or read data from the bus is not activated, said apparatus for expanding the bus of the computer comprising:

a first asynchronous circuit for
(a) latching the select signal,
(b) activating the not ready signal, said not ready signal indicating that a peripheral attached to the bus expansion apparatus is not ready to place data on or read data from the bus at the moment when said not ready signal is changed to the active state,
(c) holding the activated not ready signal a specified amount of time to allow for signal propagation times on the bus expansion apparatus until the peripheral attached to the bus unit has placed valid data or has read data from the bus, and
(d) then producing a change in the state of the not ready signal, said change in the not ready signal further causing the computer to complete the bus cycle by raising transfer enable signal to unlatch the select signal; and a second arbitration circuit for determining which peripheral attached to the bus of the computer is entitled to initiate a communication on the bus of the computer when more than one of the peripheral devices is ready to initiate a communication on the bus, and at least one of the peripheral devices ready to initiate a communication on the bus is a device attached to the bus expansion apparatus.

10. The apparatus of claim 9, wherein the first circuit includes an asynchronous state machine which further comprises:

a state indicator which produces a signal Z0 and a signal Z1 wherein Z0 and Z1 pass through four successive combinations to indicate a first state, a second state, a third state and a fourth state; and
a delay line for delaying the progression of a signal therethrough; and
means for producing a latch signal indicating the select signal from the computer has been latched;
means for producing a wait signal having a high state and a low state;
wherein, said not ready signal is activated in response to the wait signal and the latch signal, and
wherein the state indicator changes from a first state to a second state in response to the signal indicating that the bus is ready to transfer data, and
wherein, a pulse is input to the delay line in response to the state indicator changing from said first state to said second state, and
wherein, the state indicator changes from a second state to a third state in response to the pulse in the delay line being output from the delay line, and
wherein, the pulse input to the delay line is ended in response to the state indicator changing from the second state to the third state, and
wherein, the state indicator changes from the third state to the fourth state in response to the output of the delay line indicating the trailing edge of the previously inputted pulse thereby signifying no pulse currently propagating through the delay line, and wherein the states of the wait signal is placed in a low state in response to the state indicator changing from state three to four, and wherein said not ready signal is deactivated when the wait signal changes to low, and wherein the transfer enable signal is changed to indicate the bus is not longer able to transfer data in response to said deactivation of not read signal, and
wherein the latched select signal is unlatched in response to the select signal not indicating a valid address and status and said transfer enable signal indicating the bus is no longer able to transfer data, and
wherein, the state indicator changes from the fourth state to the first state in response to the transfer enable signal indicating the bus is no longer able to transfer data, and
wherein the wait signal returns high in response to the state indicator changing from the fourth state to the first state.

11. A method for extending a bus on a computer having a fixed number of slots for devices to accommodate a greater number of devices than said fixed number of slots, said computer bus having an asynchronous bus cycle and having a signal to receive information from the bus or place information on the bus and having an address and status signals, said method for extending a bus comprising the steps of:

attaching a bus expansion unit having additional slots to accommodate devices to one of the fixed slots on the computer bus;
attaching devices to the bus expansion unit;
recognizing an asynchronous communication on said bus, said communication indicating the address and bus cycle status of a selected device attached to the bus expansion unit;
activating the signal indicating that the selected device attached to the bus expansion unit is not ready to receive data or place data on the bus of the computer; and
deactivating the signal indicating that the device attached to the bus expansion unit is not ready to received data after a selected amount of time, said selected amount of time representing an amount of time necessary to allow the device to prepare to receive data or place data on the bus.

12. The method of claim 11 further comprising the step of determining which of the devices either attached to one of the slots on the computer bus or to one of the slots on the bus expansion unit is entitled to initiate a communication on the bus of the computer when more than one of the device seeks to initiate a communication on the bus.

13. A bus expansion apparatus for expanding the bus of a computer system, said bus having an asynchronous bus cycle and a fixed number of slots, each of said fixed number of slots being capable of receiving a respective peripheral device, each said peripheral device having a respective unique address, said bus including an address bus portion for communicating the address a device attached to said bus which is the destination of a bus communication, said computer requiring a response when a peripheral addressed by said address bus portion cannot accomplish respond to a bus communication in an amount of time allocated by said asynchronous bus cycle, said bus expansion apparatus comprising:

a driver unit having a bus connector for plugging into one of said fixed number of slots of said bus, said driver unit being capable of receiving and transmitting bus communications;

recognition means in said driver unit, connected to said bus connector, for determining whether the address contained in a bus communications received by said driver unit corresponds to the address of a first peripheral device attached to the receiver unit;

select signal means responsive to the recognition means for producing a select signal indicating that the address contained in said bus communication corresponds to the address of said first peripheral device, said signal being produced for a length of time the computer system indicates the address is valid; and asynchronous means in said driver unit, connected to said select signal means and to said bus connector, for activating a not ready signal on said bus in response to the production of the select signal, said not ready signal being activated for an amount of time necessary for the first peripheral device addressed by said bus communication to respond to the computer when the first peripheral device cannot respond to the bus communication within the allocated amount of time.

14. The bus expansion apparatus of claim 13, further comprising a cable connecting said driver unit to said receiver unit, wherein said driver unit is located within a chassis of said computer system, and said receiving unit is located outside said chassis.

15. The bus expansion apparatus of claim 13, wherein said receiver unit comprises means for connecting to a plurality of peripheral devices.

16. The bus expansion apparatus of claim 15, wherein said receiver unit comprises a mother board mounting a plurality of expansion slots, each of said expansion slots having the same form factor as said slots of said bus and being capable of receiving peripheral devices capable of being received by said slots of said bus.

17. The bus expansion apparatus of claim 13, wherein said driver unit further comprises:

arbitration means for determining which device among a plurality of devices attached to said bus or to said receiver unit is entitled to initiate a communication on the bus when more than one of the devices is ready to initiate a communication on the bus.

* * * * *